(12) United States Patent
Pierce

(10) Patent No.: US 11,627,149 B2
(45) Date of Patent: *Apr. 11, 2023

(54) SECURITY MONITORING OF NETWORK CONNECTIONS USING METRICS DATA

(71) Applicant: Splunk, Inc., San Francisco, CA (US)

(72) Inventor: John Clifton Pierce, San Jose, CA (US)

(73) Assignee: SPLUNK INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/889,486

(22) Filed: Jun. 1, 2020

(65) Prior Publication Data

US 2020/0366691 A1 Nov. 19, 2020

Related U.S. Application Data

(63) Continuation of application No. 15/418,464, filed on Jan. 27, 2017, now Pat. No. 10,673,870.

(51) Int. Cl.
*G06F 21/00* (2013.01)
*H04L 9/40* (2022.01)
*H04L 43/0888* (2022.01)
*H04L 41/142* (2022.01)
*H04L 43/0894* (2022.01)

(52) U.S. Cl.
CPC ........ *H04L 63/1416* (2013.01); *H04L 41/142* (2013.01); *H04L 43/0888* (2013.01); *H04L 63/1441* (2013.01); *H04L 43/0894* (2013.01); *H04L 2463/121* (2013.01)

(58) Field of Classification Search
None
See application file for complete search history.

(56) References Cited

U.S. PATENT DOCUMENTS

| 7,069,588 | B2 * | 6/2006 | Call | H04L 63/1458 |
| | | | | 713/192 |
| 7,526,807 | B2 | 4/2009 | Jonathan et al. | |
| 7,739,740 | B1 | 6/2010 | Nachenberg et al. | |
| 8,196,207 | B2 | 6/2012 | Hill et al. | |
| 8,201,234 | B2 * | 6/2012 | Diaz-Cuellar | H04L 63/20 |
| | | | | 709/200 |

(Continued)

*Primary Examiner* — Maung T Lwin
(74) *Attorney, Agent, or Firm* — Artegis Law Group, LLP

(57) ABSTRACT

Various embodiments of the present invention set forth techniques for security monitoring of a network connection, including analyzing network traffic data for a network connection associated with a computing device, identifying one or more network traffic metrics for the network connection based on the network traffic data, determining that the network connection corresponds to at least one network connection profile based on the one or more network traffic metrics, detecting a potential security threat for the network connection based on the one or more network traffic metrics and the at least one network connection profile, and initiating a mitigation action with respect to the network connection in response to detecting the potential security threat. Advantageously, the techniques allow detecting potential security threats based on network traffic metrics and categorizations, without requiring monitoring of the content or the total volume of all traffic exchanged via the connection.

29 Claims, 19 Drawing Sheets

(56) References Cited

U.S. PATENT DOCUMENTS

| | | |
|---|---|---|
| 8,412,696 B2 | 4/2013 | Zhang et al. |
| 8,448,245 B2 | 5/2013 | Banerjee et al. |
| 8,589,375 B2 | 11/2013 | Zhang et al. |
| 8,589,403 B2 | 11/2013 | Marquardt et al. |
| 8,589,432 B2 | 11/2013 | Zhang et al. |
| 8,682,925 B1 | 3/2014 | Marquardt et al. |
| 8,738,587 B1 | 5/2014 | Bitincka et al. |
| 8,738,629 B1 | 5/2014 | Bitincka et al. |
| 8,788,525 B2 | 7/2014 | Neels et al. |
| 8,788,526 B2 | 7/2014 | Neels et al. |
| 8,826,434 B2 | 9/2014 | Merza |
| 8,837,298 B2* | 9/2014 | Putnam .................. H04L 43/12 709/224 |
| 8,983,994 B2 | 3/2015 | Neels et al. |
| 9,106,693 B2* | 8/2015 | Quinlan ............. H04L 63/1441 |
| 9,124,612 B2 | 9/2015 | Vasan et al. |
| 9,128,980 B2 | 9/2015 | Neels et al. |
| 9,128,985 B2 | 9/2015 | Marquardt et al. |
| 9,130,971 B2 | 9/2015 | Vasan et al. |
| 9,173,801 B2 | 11/2015 | Merza |
| 9,189,623 B1 | 11/2015 | Lin et al. |
| 9,215,240 B2 | 12/2015 | Merza et al. |
| 9,248,068 B2 | 2/2016 | Merza |
| 9,258,328 B2* | 2/2016 | Ibatullin ............. H04L 63/1466 |
| 9,426,172 B2 | 8/2016 | Merza |
| 9,432,396 B2 | 8/2016 | Merza |
| 9,514,189 B2 | 12/2016 | Bitincka et al. |
| 9,536,077 B2* | 1/2017 | Bignon ............. H04L 63/1441 |
| 9,560,064 B2* | 1/2017 | Chasin ................ H04L 63/145 |
| 9,589,012 B2 | 3/2017 | Neels et al. |
| 9,654,485 B1 | 5/2017 | Neumann |
| 2006/0206935 A1 | 9/2006 | Choi et al. |
| 2007/0050777 A1 | 3/2007 | Hutchinson et al. |
| 2007/0064617 A1 | 3/2007 | Reves |
| 2007/0186282 A1 | 8/2007 | Jenkins |
| 2009/0300156 A1* | 12/2009 | Yalakanti ............ H04L 41/0806 726/22 |
| 2009/0328209 A1 | 12/2009 | Nachenberg |
| 2010/0199352 A1* | 8/2010 | Hill ........................ G06F 21/577 726/25 |
| 2010/0332373 A1* | 12/2010 | Crabtree ................ G06Q 40/04 709/224 |
| 2011/0099500 A1 | 4/2011 | Smith et al. |
| 2011/0276396 A1 | 11/2011 | Rathod |
| 2012/0131674 A1 | 5/2012 | Wittenschlaeger |
| 2013/0276089 A1 | 10/2013 | Tseitlin et al. |
| 2013/0298230 A1* | 11/2013 | Kumar ................ H04L 63/1425 726/22 |
| 2013/0318236 A1 | 11/2013 | Coates et al. |
| 2013/0326620 A1 | 12/2013 | Merza et al. |
| 2014/0157405 A1 | 6/2014 | Joli et al. |
| 2014/0223556 A1* | 8/2014 | Bignon ............... G06F 9/45558 726/22 |
| 2014/0325058 A1 | 10/2014 | Fletcher et al. |
| 2014/0325363 A1 | 10/2014 | Fletcher et al. |
| 2014/0330815 A1 | 11/2014 | Bitincka et al. |
| 2015/0019537 A1 | 1/2015 | Neels et al. |
| 2015/0067866 A1* | 3/2015 | Ibatullin ............. H04L 63/1466 726/25 |
| 2015/0096020 A1 | 4/2015 | Adams et al. |
| 2016/0004750 A1 | 1/2016 | Marquardt et al. |
| 2016/0021135 A1* | 1/2016 | Chesla .................. H04L 63/145 726/23 |
| 2016/0088125 A1 | 3/2016 | Polychronis |
| 2016/0330222 A1* | 11/2016 | Brandt ................... G06N 5/047 |
| 2016/0352766 A1* | 12/2016 | Flacher .................... H04L 67/10 |
| 2017/0078321 A1* | 3/2017 | Maylor ............. H04L 63/1433 |
| 2017/0245176 A1* | 8/2017 | Murphy .................. H04W 8/18 |

\* cited by examiner

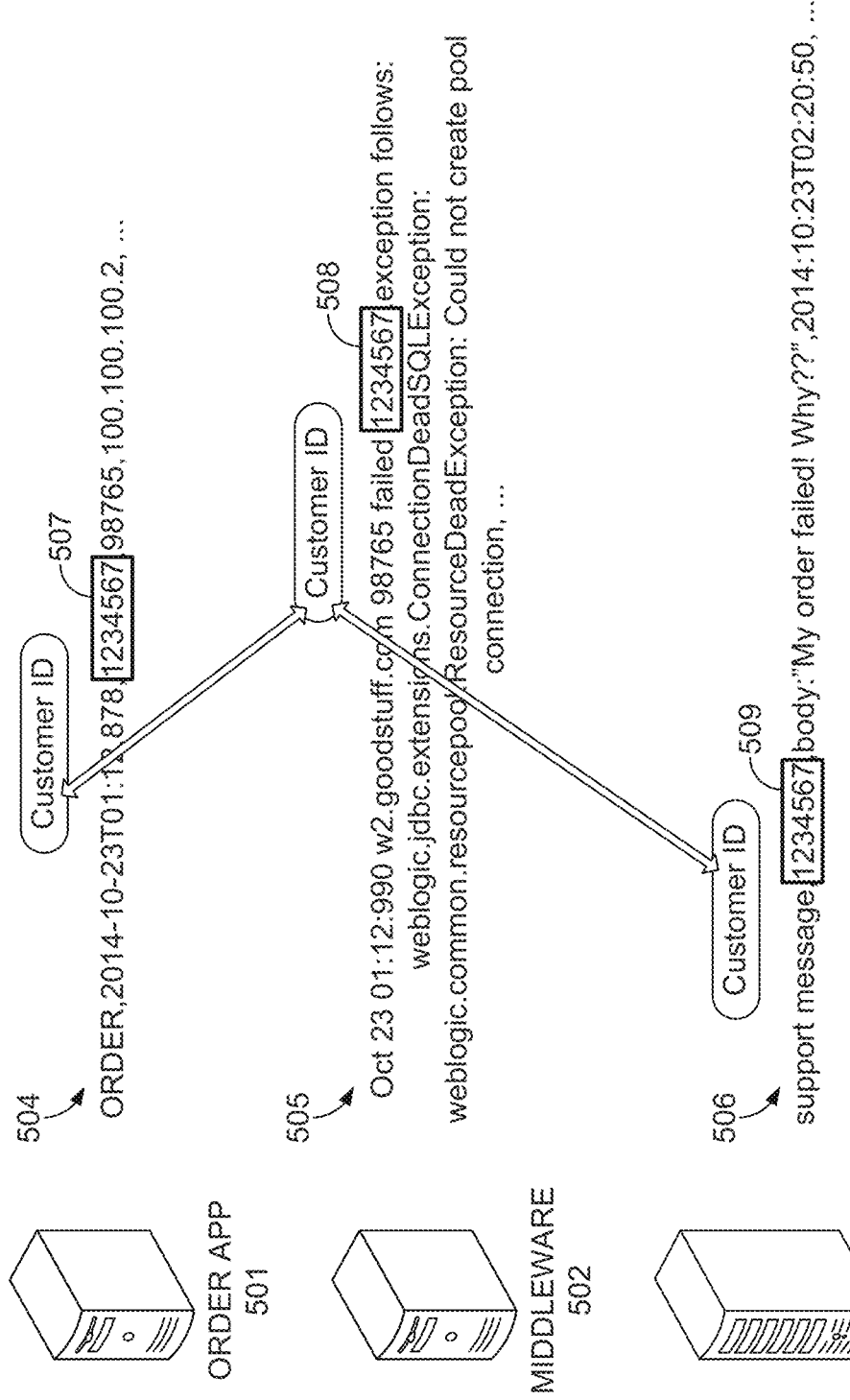

| Data Summary | | | |
|---|---|---|---|
| Hosts (5) | Sources (8) | Sourcetypes (3) | |
| filter | | | |
| Host ◇ | | Count ◇ | Last Update ◇ |
| mailsv | ▥ ∨ | 9,829 | 4/29/14 1:32:47.000 PM |
| vendor_sales | ▥ ∨ | 30,244 | 4/29/14 1:32:46.000 PM |
| www1 | ▥ ∨ | 24,221 | 4/29/14 1:32:44.000 PM |
| www2 | ▥ ∨ | 22,595 | 4/29/14 1:32:47.000 PM |
| www3 | ▥ ∨ | 22,975 | 4/29/14 1:32:45.000 PM |

FIG. 6B splunk > User Behavior Analytics

Home / Anomalies Table / Anomaly Details

Unusual Machine Access

Event Date: Jan 12, 2017 8:00 AM

Categories: [Internal] [Lateral Movement] [Rule Based] [Unusual Activity]

Score: 8

⊕ Explore ⌄ | ✱ Analytics ⌄ | ⚙ Config ⌄ | admin ⌄

A SSH connection was established to external server 52.198.54.54 from host 10.10.10.209. The traffic patterns for this connection indicate a possible reverse shell where the remote SSH server has control over the internal host. The internal host should be investigated for signs of compromise.

★ Watchlist ⌄

▦ Actions ⌄

DEVICES (1)

Internal 10.10.10.209

(1)

External SSH Reverse Shell

A SSH connection was established to external server 52.198.54.54 from host 10.10.10.209. The traffic patterns for this connection indicate a possible reverse shell where the remote SSH server has control over the internal host. The internal host should be investigated for signs of compromise.

| DESTINATION | SOURCE |
|---|---|
| [52.198.54.54] | [10.10.10.209] |

SECURITY MONITORING OF NETWORK CONNECTIONS USING METRICS DATA

CROSS-REFERENCE TO RELATED APPLICATIONS

This application is a continuation of the co-pending U.S. patent application titled, "SECURITY MONITORING OF NETWORK CONNECTIONS USING METRICS DATA," filed on Jan. 27, 2017 and having Ser. No. 15/418,464. The subject matter of this related application is hereby incorporated herein by reference.

BACKGROUND OF THE INVENTION

Field of the Invention

Embodiments of the present invention relate generally to computer network security and, more specifically, to security monitoring of network connections using metrics data.

Description of the Related Art

In the field of computer networks, network security has become of paramount importance. In general, networked computing devices are vulnerable to various kinds of attacks, including attacks intended to affect the operation of the computing devices, and attacks intended to access or steal sensitive or valuable data stored on the computing devices. Such attacks may attempt to access the computing devices remotely or may attempt to implement malicious computer code or malware to access a computing device from within the computing device itself or from within a local network associated with the computing device. As a result, providing adequate security for these computing devices and associated network connections has become a primary concern for owners and operators of computer networks. In that regard, several approaches to securing networked computing devices and their associated network connections have been developed. However, each of these conventional approaches has certain drawbacks.

One conventional approach to network security entails monitoring and analyzing the actual content of the data being exchanged via different network connections of a computer network. With such an approach, a network operator or administrator determines a priori the particular connections to monitor and the particular pieces of content to search for, where particular pieces of content on particular connections represent some form of an attack. For example, an operator of a computer network could maintain a database containing several pieces of content, such as text strings, operational code such as shellcode, signatures, and the like, where the database indicates that these pieces of content represent various forms of attacks. Subsequently, the operator of the computer network could monitor all network traffic to determine whether one of the pieces of content included in the database is transferred over the network, thus representing an attack on the network.

One drawback of this first approach to network security is that network content is identified as malicious only if the content matches one of the pieces of content previously determined to be associated with an attack and included in the requisite database. As a result, an attacker may circumvent this type of network security by altering the data being exchanged via the network in some way to differentiate that data from the particular pieces of content for which searching and monitoring operations are being performed. For example, in order to avoid detection, an attacker could slightly alter a piece of malicious computer code to change one or more operation commands, text strings, or any resulting signatures to differentiate the malicious code or data being exchanged related to the malicious code from the particular pieces of content for which searching and monitoring operations are being conducted. In addition, an attacker could make detection more difficult by changing the type of network connection or port within a network connection being used for an attack or by encrypting all malicious data being exchanged via the network connection or port.

Another conventional approach to network security entails monitoring the total volume of all traffic being exchanged via a computer network and looking for substantial increases in that total volume of network traffic that are indicative of a network attack. For example, an increase in total network traffic above some threshold amount could result from a network attack, where data is accessed from one or more computing devices within the network and transmitted to a malicious attacker.

One drawback of this second approach to network security is that, sensitive or valuable data that is accessed by and transmitted to an attacker may constitute only a small amount data. In such cases, the network traffic generated by the stolen data is quite small relative to the amount of network traffic across the overall network. If the network traffic related to the stolen data is relatively small, then the attack may very well go undetected. For example, an attacker may seek a small amount of information, such as information about a particular customer, a sales lead, or financial account information for a customer, or an attacker may break larger pieces of data into smaller portions and transmit the smaller portions over a long time span in order to avoid detection. Although the threshold increase in total network traffic signaling a network attack can be decreased to detect thefts of smaller amounts of data, such an approach is oftentimes impractical, because the number of false positives, where increases in legitimate network traffic are incorrectly associated with network attacks, may increase to unacceptable levels.

As the foregoing illustrates, what is needed in the art are more effective ways to monitor computer networks for network attacks.

SUMMARY OF THE INVENTION

Various embodiments of the present invention set forth a computer-implemented method, the method including analyzing network traffic data for a network connection associated with a computing device. The method further includes identifying one or more network traffic metrics for the network connection based on the network traffic data. The method further includes determining that the network connection corresponds to at least one network connection profile based on the one or more network traffic metrics. The method further includes detecting a potential security threat for the network connection based on the one or more network traffic metrics and the at least one network connection profile. The method further includes initiating a mitigation action with respect to the network connection in response to detecting the potential security threat.

Other embodiments of the present invention include, without limitation, a computer-readable medium including instructions for performing one or more aspects of the disclosed techniques, as well as a computing device for performing one or more aspects of the disclosed techniques.

Advantageously, the techniques disclosed herein allow detecting potential security threats to a connection based on the metrics of the network traffic data, without requiring monitoring of the specific content of the data being exchanged or monitoring the total volume of all traffic exchanged via the connection. The detecting of potential security threats without monitoring the specific content of the data or the total volume of all exchanges avoids the disadvantages associated with conventional approaches, as described herein. Further, monitoring based on the metrics of the network traffic data increases efficiency of the security monitoring, as the metrics and the network traffic data may be derived directly from the network traffic. More specifically, the technique includes categorizing the network connection, in order to perform a more focused analysis of potential security threats depending on the categorization of the connection, so that potential security threats can be detected with increased efficiency and accuracy relative to prior approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 illustrates a scenario where a common customer ID is found among log data received from three disparate sources in accordance with the disclosed embodiments;

FIG. 6B illustrates a data summary dialog that enables a user to select various data sources in accordance with the disclosed embodiments;

FIG. 16 illustrates an example of a user interface for displaying a reverse shell potential security threat in accordance with the disclosed embodiments;

DETAILED DESCRIPTION

Figure 1:
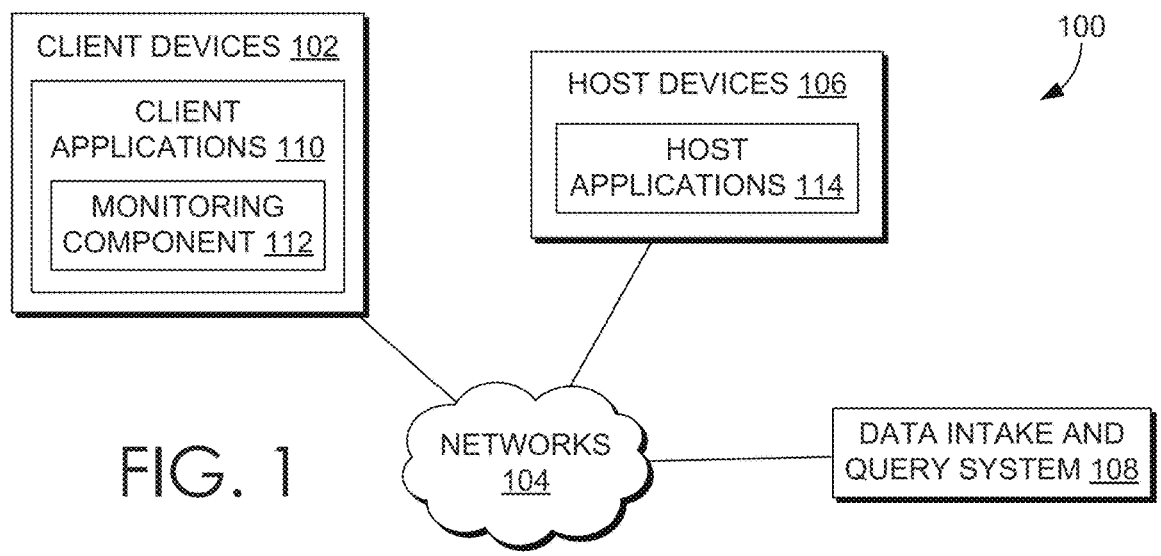
FIG. 1 illustrates a networked computer environment in which an embodiment may be implemented.

In the following description, numerous specific details are set forth to provide a more thorough understanding of the present invention. However, it will be apparent to one of skill in the art that embodiments of the present invention may be practiced without one or more of these specific details.

System Overview

Embodiments are described herein according to the following outline:

1.0. General Overview
2.0. OPERATING ENVIRONMENT
   2.1. HOST DEVICES
   2.2. CLIENT DEVICES
   2.3. CLIENT DEVICE APPLICATIONS
   2.4. DATA SERVER SYSTEM
   2.5. DATA INGESTION
      2.5.1. INPUT
      2.5.2. PARSING
      2.5.3. INDEXING
   2.6. QUERY PROCESSING
   2.7 FIELD EXTRACTION
   2.8. EXAMPLE SEARCH SCREEN
   2.9. DATA MODELS
   2.10. ACCELERATION TECHNIQUES
      2.10.1. AGGREGATION TECHNIQUE
      2.10.2. KEYWORD INDEX
      2.10.3. HIGH PERFORMANCE ANALYTICS STORE
      2.10.4. ACCELERATING REPORT GENERATION
   2.11. SECURITY FEATURES
   2.12. Cloud-Based System Overview
   2.13. Searching Externally Archived Data
      2.13.1. ERP Process Features
   2.14. IT Service Monitoring
3.0. Monitoring a Connection via Network Traffic Metrics and Categorization of the Connection
   3.1. Analyze Received Network Traffic Data
   3.2. Identify Metrics from the Received Network Traffic Data
      3.2.1. Total Number of Bytes Exchanged Metric
      3.2.2. Total Number of Packets Exchanged Metric
      3.2.3. Duration of Connection Metric 3.2.4. Efficiency Metric (Average Packet Size)
      3.2.5. Responsiveness Metric (Packets Exchanged Per Second (PPS))
      3.2.6. Symmetry/Byte Ratio Metric
   3.3. Categorize the Connection
      3.3.1. Transfer Connection
      3.3.2. Request/Response Connection
      3.3.3. Human Connection
      3.3.4. Machine Connection
      3.3.5. Probe or Probe/ACK Connection
      3.3.6. Interactive Connection
      3.3.7. Balanced Connection
      3.3.8. Reversed Connection
      3.3.9. Summary Table of Categories and Exemplary Metrics
      3.3.10. Category and Behavior Profile Determined Adaptively
   3.4. Detect Potential Security Threats
      3.4.1. Aggregate Metrics and Categorization associated with the Connection
      3.4.2. Store Metrics associated with the Connection
      3.4.3. Detect Violations of Network Communication Protocols as Potential Security Threats
      3.4.4. Detect Deviations in Metrics or Behavior of Connection as Potential Security Threats
      3.4.5. Detect Reversed Connections as Potential Security Threats
      3.4.6. Detect Certain Transfer Connections as Potential Security Threats
      3.4.7. Detect Probe or Probe/ACK Activity as Potential Security Threats
   3.5. Initiate Mitigation Action
1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events." An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data." In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art will understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol.

Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
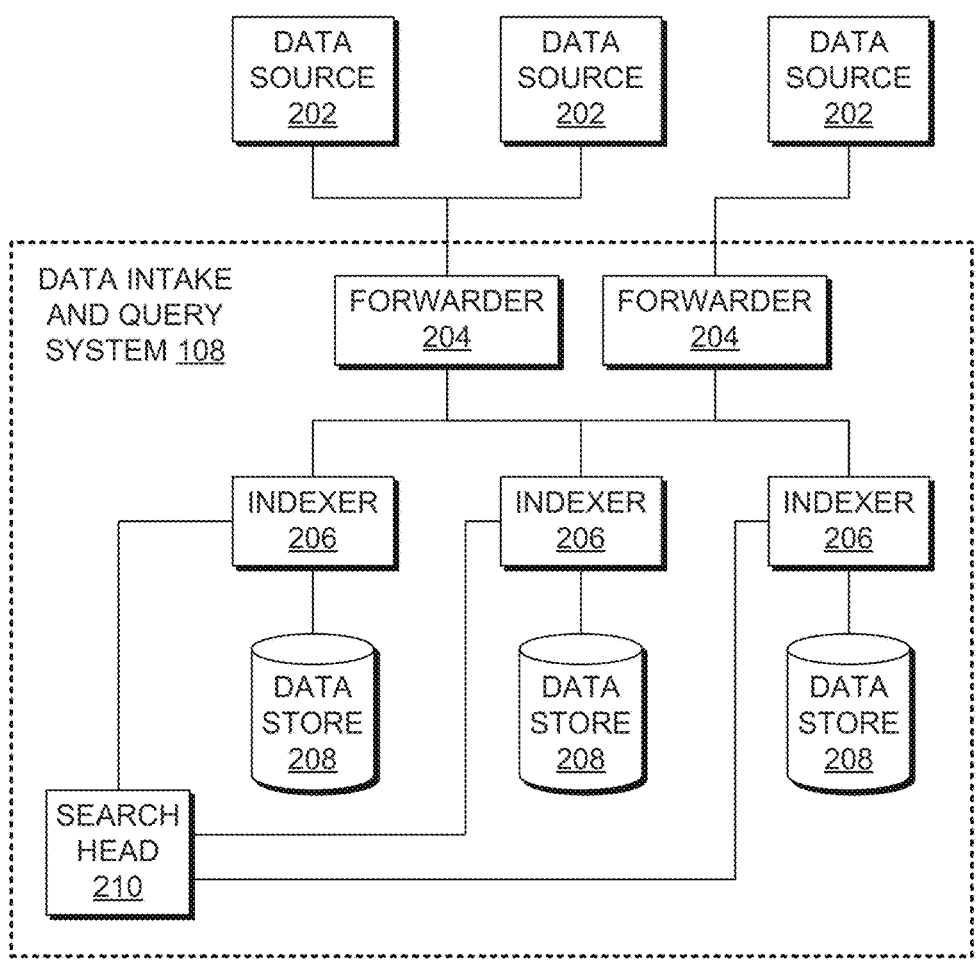
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
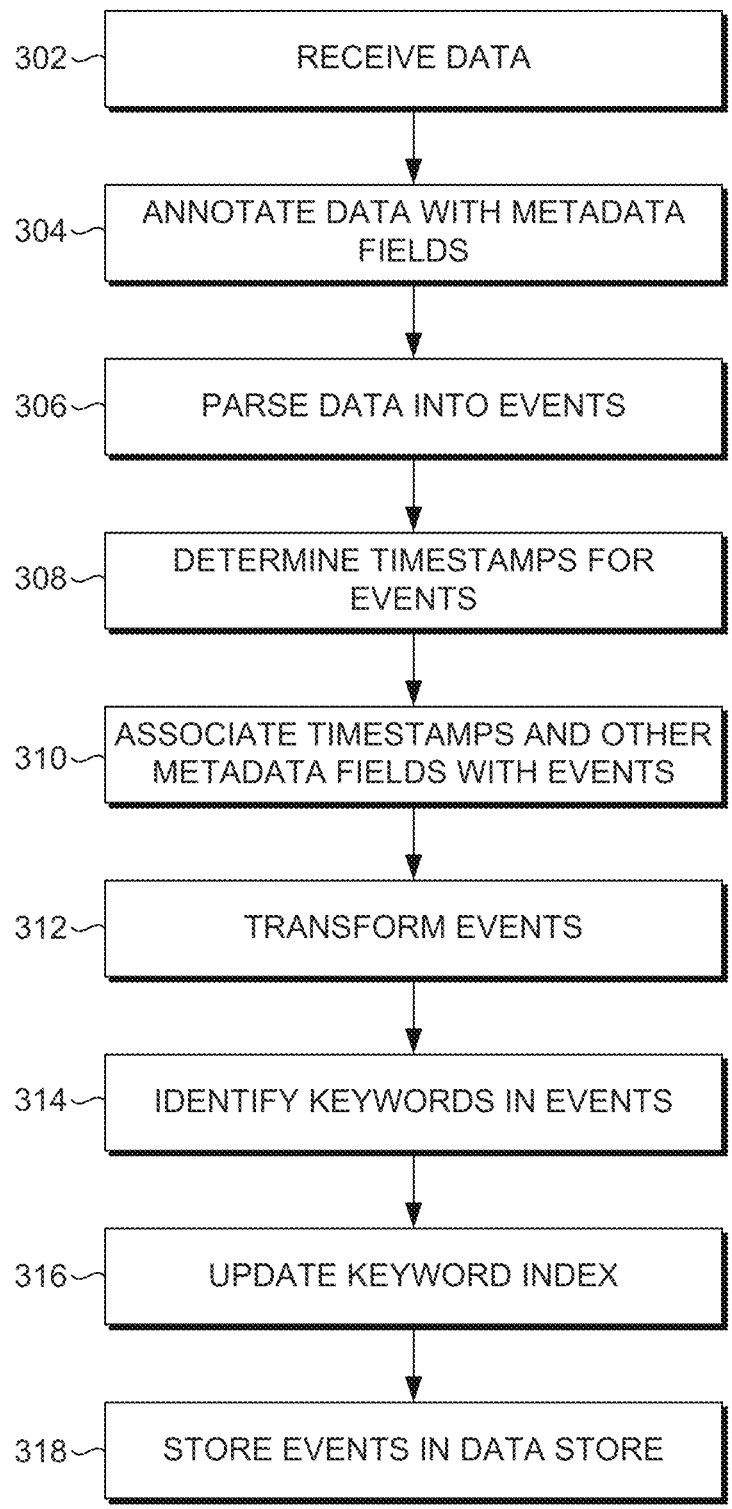
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art will understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks" or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
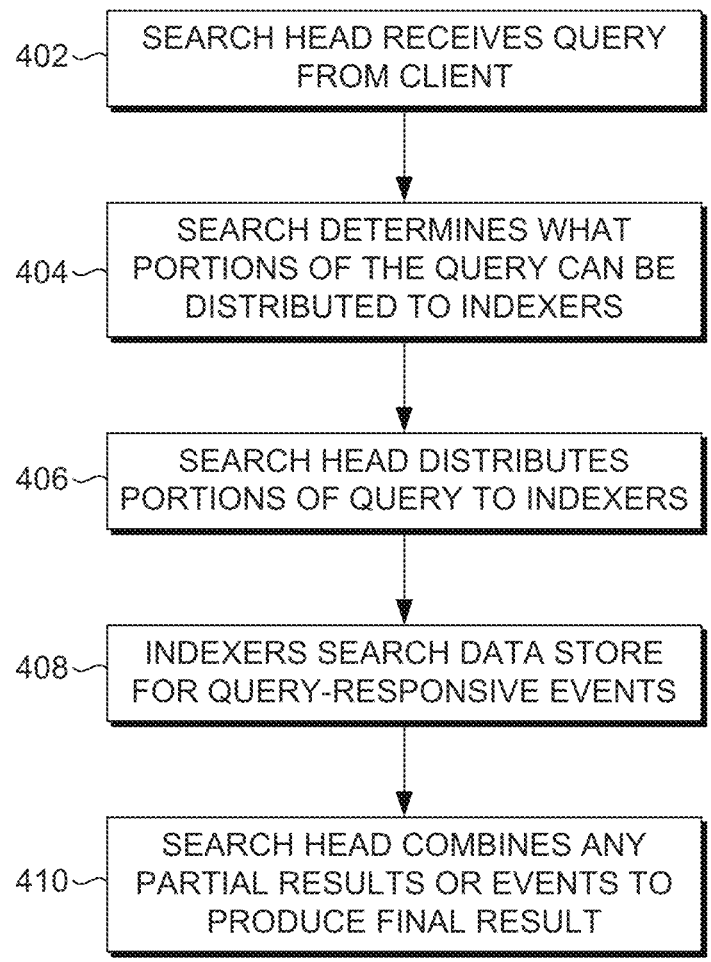
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
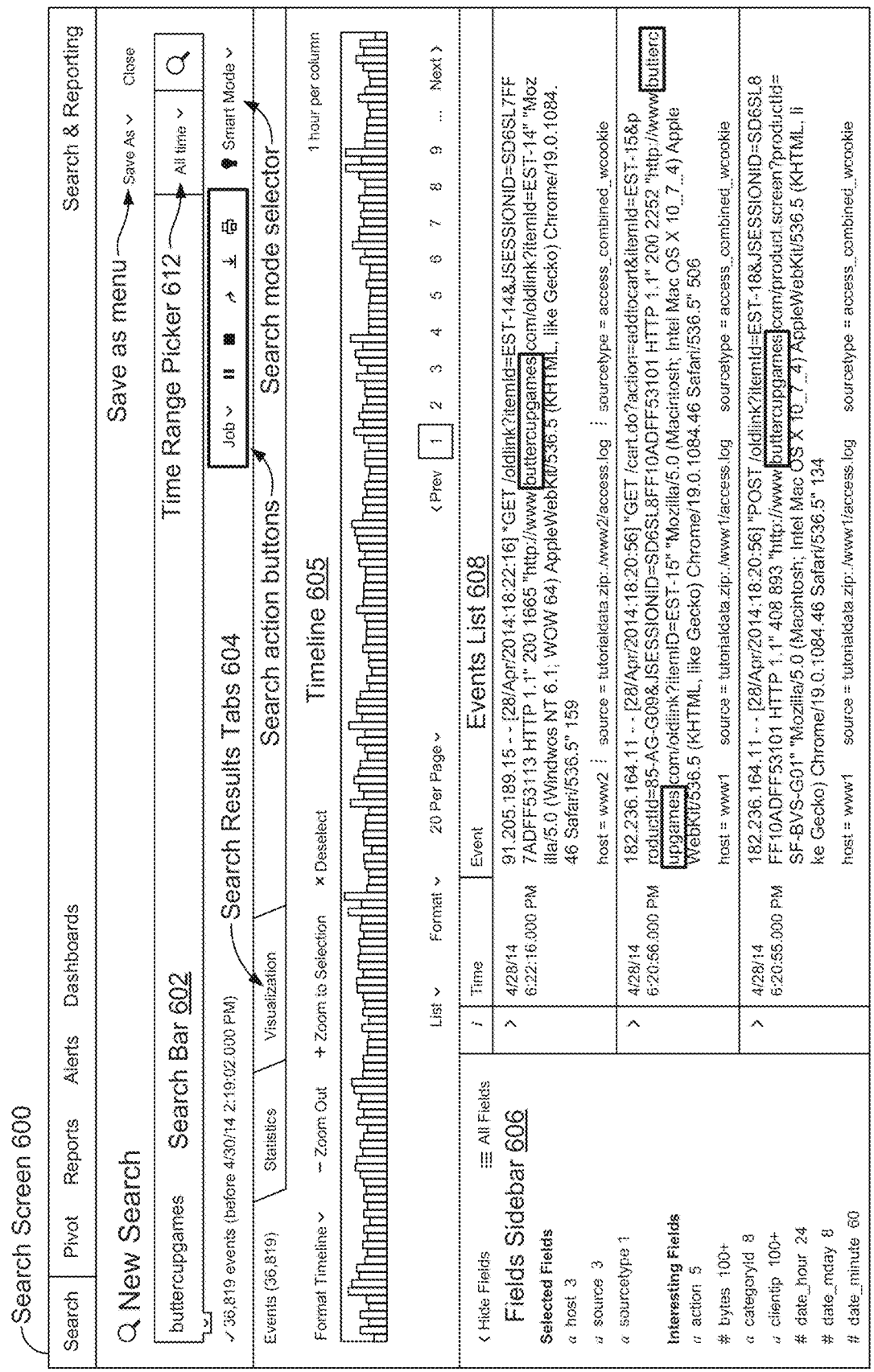
FIG. 6A illustrates a search screen in accordance with the disclosed embodiments.

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 7:
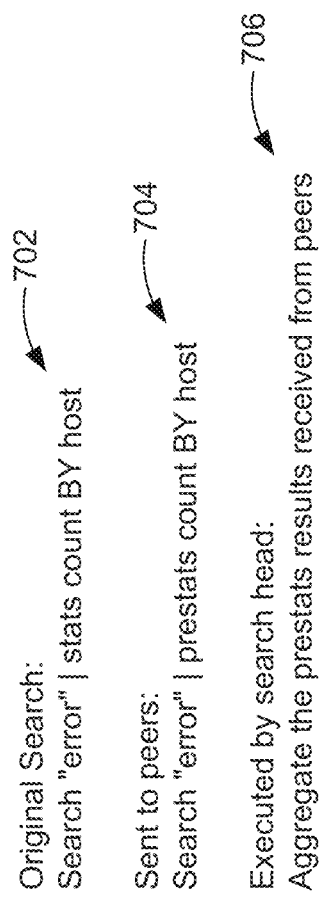
FIG. 7 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 7 illustrates how a search query 702 received from a client at a search head 210 can split into two phases, including: (1) subtasks 704 (e.g., data retrieval or simple filtering) that may be performed in parallel by indexers 206 for execution, and (2) a search results aggregation operation 706 to be executed by the search head when the results are ultimately collected from the indexers.

During operation, upon receiving search query 702, a search head 210 determines that a portion of the operations involved with the search query may be performed locally by the search head. The search head modifies search query 702 by substituting "stats" (create aggregate statistics over results sets received from the indexers at the search head) with "prestats" (create statistics by the indexer from local results set) to produce search query 704, and then distributes search query 704 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 706 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "Distributed High Performance Analytics Store", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "Compressed Journaling In Event Tracking Files For Metadata Recovery And Replication", issued on 19 Nov. 2013, U.S. Pat. No. 8,412,696, entitled "Real Time Searching And Reporting", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 8A:
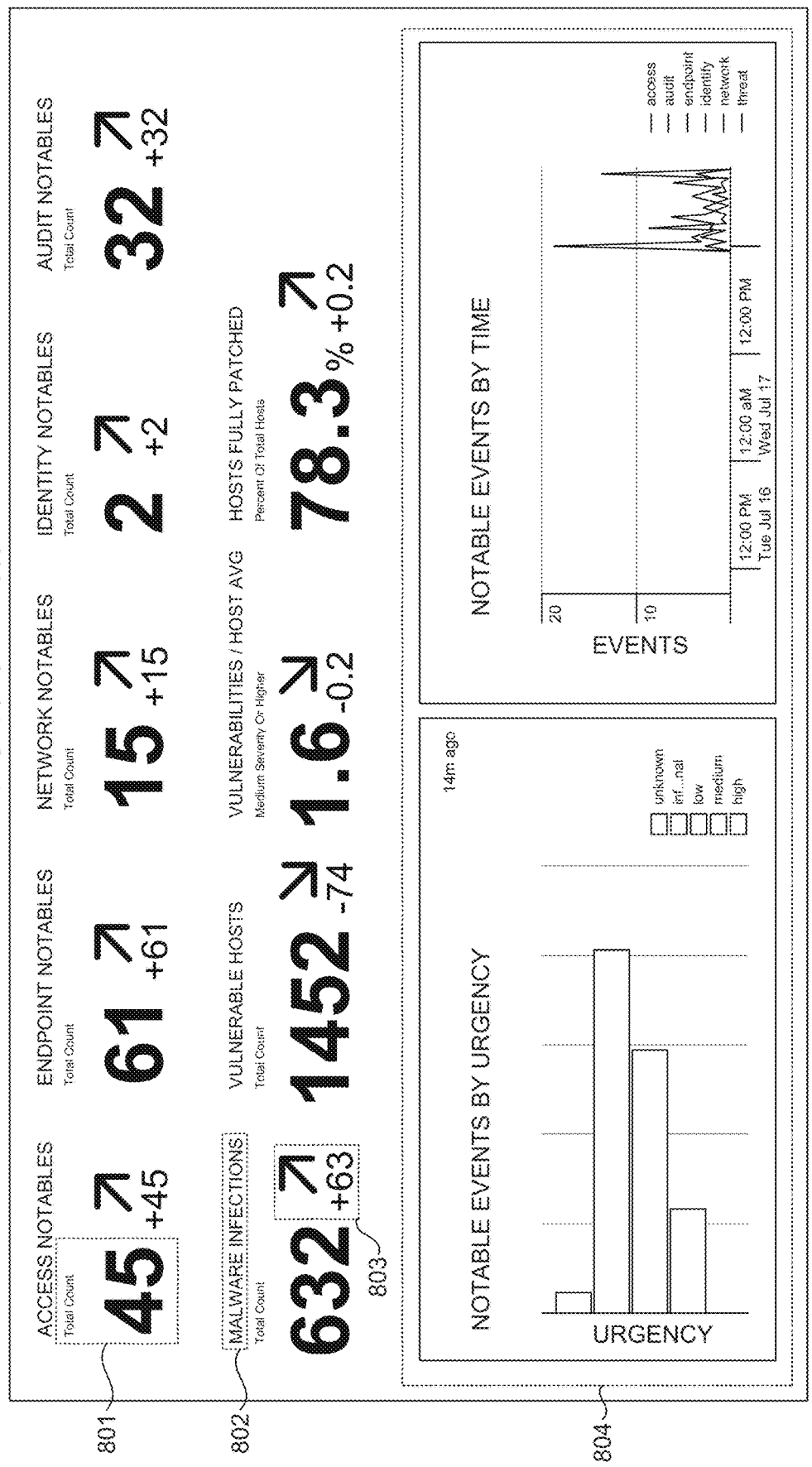
FIG. 8A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 8A illustrates an example key indicators view 800 that comprises a dashboard, which can display a value 801, for various security-related metrics, such as malware infections 802. It can also display a change in a metric value 803, which indicates that the number of malware infections increased by 63 during the preceding interval. Key indicators view 800 additionally displays a histogram panel 804 that displays a histogram of notable events organized by urgency values, and a histogram of notable events organized by time intervals. This key indicators view is described in further detail in pending U.S. patent application Ser. No. 13/956,338, entitled "Key Indicators View", filed on 31 Jul. 2013, and which is hereby incorporated by reference in its entirety for all purposes.

Figure 8B:
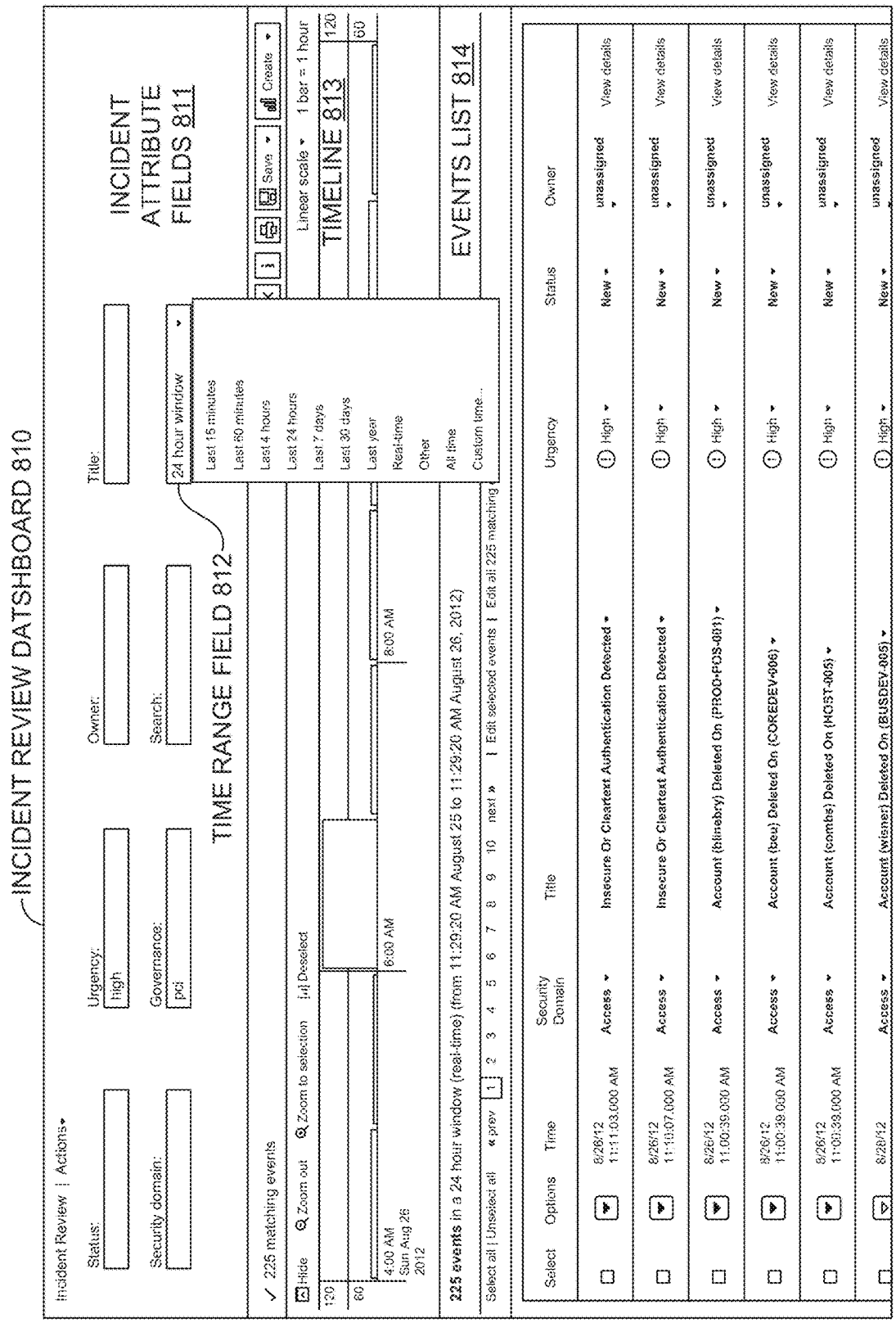
FIG. 8B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 8B illustrates an example incident review dashboard 810 that includes a set of incident attribute fields 811 that, for example, enables a user to specify a time range field 812 for the displayed events. It also includes a timeline 813 that graphically illustrates the number of incidents that occurred in time intervals over the selected time range. It additionally displays an events list 814 that enables a user to view a list of all of the notable events that match the criteria in the incident attributes fields 811. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 9:
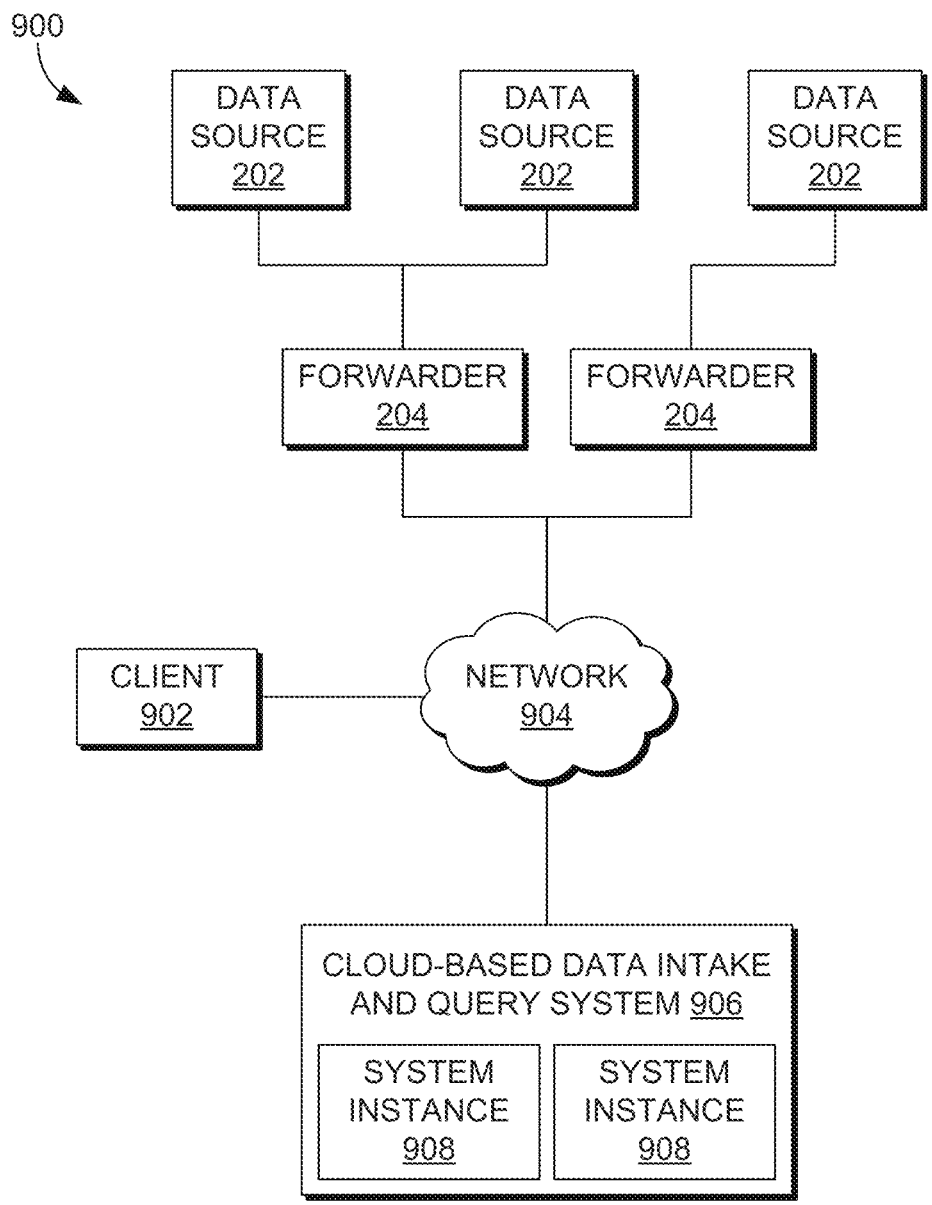
FIG. 9 illustrates a block diagram of an example cloud-based data intake and query system in which an embodiment may be implemented.

FIG. 9 illustrates a block diagram of an example cloud-based data intake and query system. Similar to the system of FIG. 2, the networked computer system 900 includes input data sources 202 and forwarders 204. These input data sources and forwarders may be in a subscriber's private computing environment. Alternatively, they might be directly managed by the service provider as part of the cloud service. In the example system 900, one or more forwarders 204 and client devices 902 are coupled to a cloud-based data intake and query system 906 via one or more networks 904. Network 904 broadly represents one or more LANs, WANs, cellular networks, intranetworks, internetworks, etc., using any of wired, wireless, terrestrial microwave, satellite links, etc., and may include the public Internet, and is used by client devices 902 and forwarders 204 to access the system 906. Similar to the system of 108, each of the forwarders 204 may be configured to receive data from an input source and to forward the data to other components of the system 906 for further processing.

In an embodiment, a cloud-based data intake and query system 906 may comprise a plurality of system instances 908. In general, each system instance 908 may include one or more computing resources managed by a provider of the cloud-based system 906 made available to a particular subscriber. The computing resources comprising a system instance 908 may, for example, include one or more servers or other devices configured to implement one or more forwarders, indexers, search heads, and other components of a data intake and query system, similar to system 108. As indicated above, a subscriber may use a web browser or other application of a client device 902 to access a web portal or other interface that enables the subscriber to configure an instance 908.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 908) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.13. Searching Externally Archived Data

Figure 10:
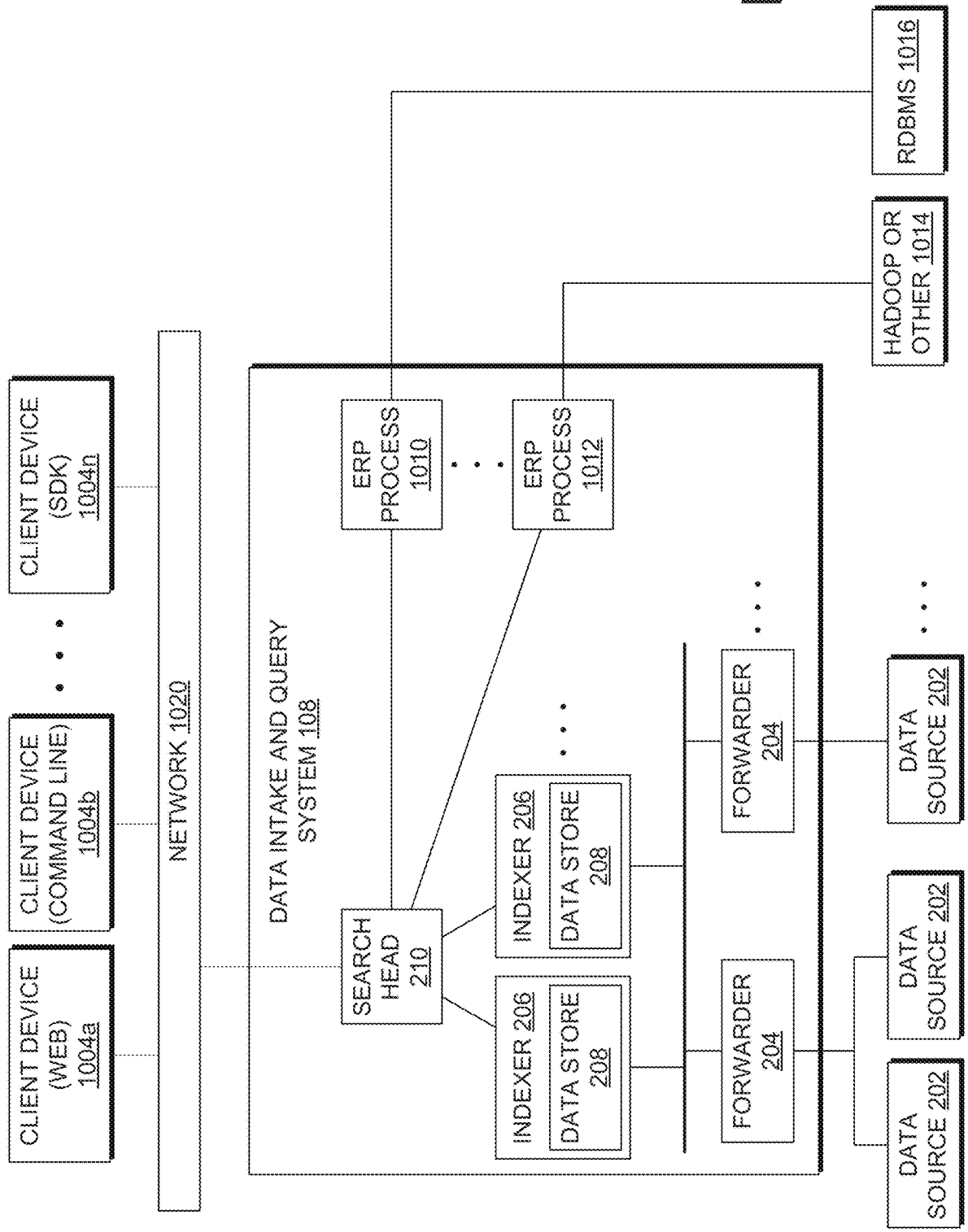
FIG. 10 illustrates a block diagram of an example data intake and query system that performs searches across external data systems in accordance with the disclosed embodiments.

FIG. 10 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1004 over network connections 1020. As discussed above, the data intake and query system 108 may reside in an enterprise location, in the cloud, etc. FIG. 10 illustrates that multiple client devices 1004a, 1004b, . . . , 1004n may communicate with the data intake and query system 108. The client devices 1004 may communicate with the data intake and query system using a variety of connections. For example, one client device in FIG. 10 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1004 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1010. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1010, 1012. FIG. 10 shows two ERP processes 1010, 1012 that connect to respective remote (external) virtual indices, which are indicated as a Hadoop or another system 1014 (e.g., Amazon S3, Amazon EMR, other Hadoop Compatible File Systems (HCFS), etc.) and a relational database management system (RDBMS) 1016. Other virtual indices may include other file organizations and protocols, such as Structured Query Language (SQL) and the like. The ellipses between the ERP processes 1010, 1012 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1010, 1012 receive a search request from the search head 210. The search head may optimize the received search request for execution at the respective external virtual index. Alternatively, the ERP process may receive a search request as a result of analysis performed by the search head or by a different system process. The ERP processes 1010, 1012 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1010, 1012 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1010, 1012 generate appropriate search requests in the protocol and syntax of the respective virtual indices 1014, 1016, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1004 may communicate with the data intake and query system 108 through a network interface 1020, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "External Result Provided Process For RetriEving Data Stored Using A Different Configuration Or Protocol", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.13.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational.' Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0. Monitoring a Connection Via Network Traffic Metrics and Categorization of the Connection As further described herein, the data intake and query system 108 described in conjunction with FIGS. 1-10 can be used in conjunction with a security monitoring system described in conjunction with FIGS. 11-17B in order to detect and mitigate attack behavior. In various embodiments, such attack behavior may be directed to client devices 102, host devices 104, and any other devices and systems communicating over one or more networks 104. The security monitoring system is capable to receive and analyze data that is part of an event is referred to herein as "event data" and stored within the data intake and query system 108. In addition, the security monitoring system is capable to receive and analyze raw machine data, such as data received or retrieved from one or more system log files, streams of network packet data, sensor data, application program data, error logs, stack traces, system performance data, and so on. The data intake and query system 108 and/or the security monitoring system divides this raw data into blocks (e.g., buckets of data, each associated with a specific time frame, etc.), and parses the raw data to produce timestamped events. The data intake and query system 108 and/or the security monitoring system stores the timestamped events in a data store. In various embodiments, such a data store may be located in either or both of the data intake and query system 108 and/or the security monitoring system. Although many of the techniques described herein are explained with reference to a data intake and query system 108, these techniques are also applicable to all other technically feasible types of data systems.

Figure 11:
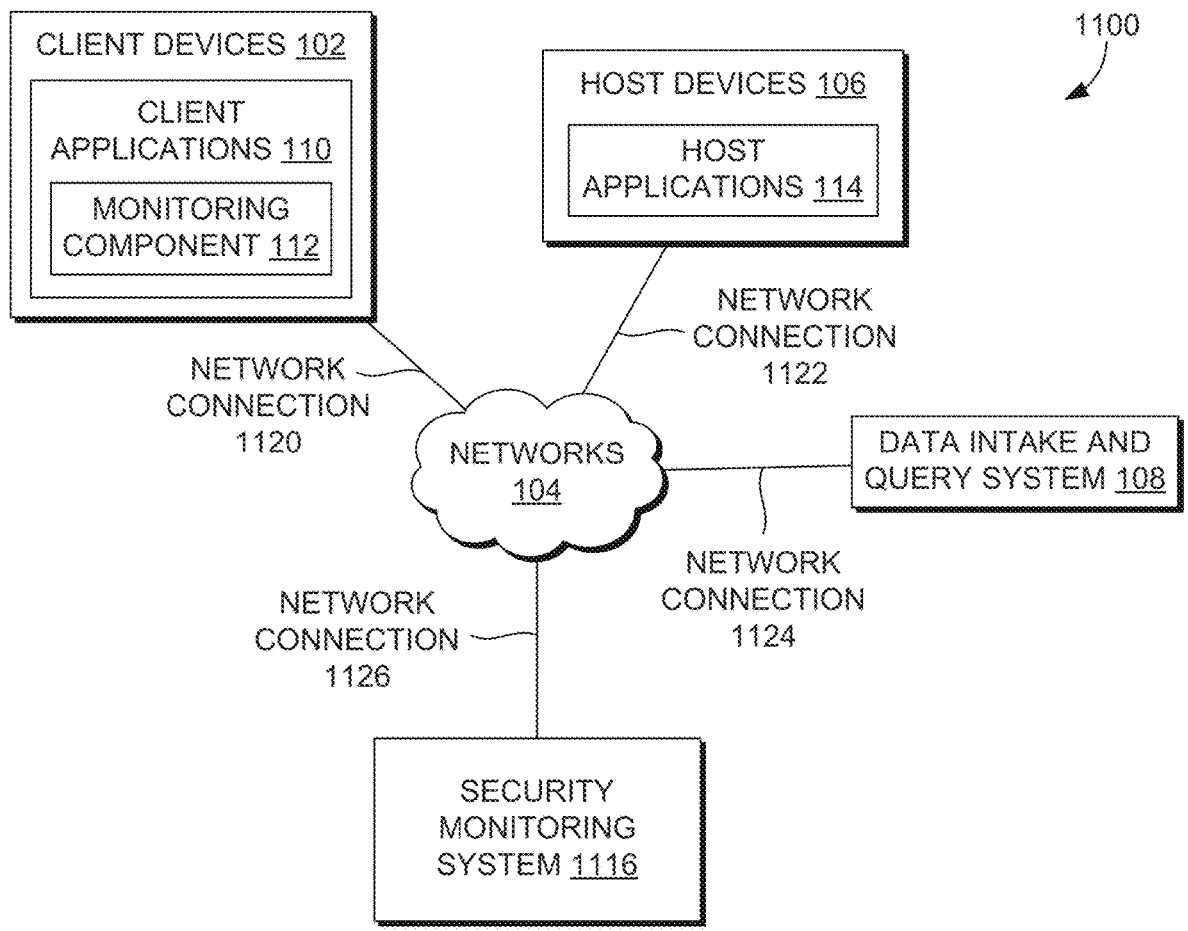
FIG. 11 illustrates another networked computer environment in which an embodiment may be implemented.

FIG. 11 illustrates another networked computer environment 1100 in which an embodiment may be implemented. As shown, the networked computer environment 1100 includes, without limitation, client devices 102, host devices 106, a data intake and query system 108, and a security monitoring system 1116 that communicate with each other over one or more networks 104. The networked computer environment 1100 also includes exemplary network connections 1120, 1122, 1124, and 1126 connecting client devices 102, host devices 106, the data intake and query system 108, and the security monitoring system 1116, respectively, via the networks 104. As shown, an exemplary network connection establishes a connection between a first computing system and a second computing system via one or more networks 104 and may include network links, switches, communication ports, or any technically feasible means of connecting the first computing system with the second computing system via the one or more networks 104. The client devices 102, host devices 106, data intake and query system 108, and networks 104 function substantially the same as corresponding elements of the networked computer environment 100 of FIG. 1 except as further described herein.

The security monitoring system 1116 is associated with the one or more computer networks 104. As further described herein, network traffic is exchanged via the one or more computer networks 104 in accordance with one or more network communications protocols. In some embodiments, network traffic is exchanged via the one or more computer networks 104 by sending and receiving data in the form of packets of data, where a transmission unit for the network traffic is a packet of data. More specifically, in some embodiments, each data packet includes a packet header and a packet payload. In some embodiments, the packet header includes information regarding the packet and/or the data stored in the packet, such as overhead, metadata, and any other technically feasible information regarding the packet and/or the data stored in the packet. In some embodiments, the packet payload includes the data bytes transmitted via the packet.

The security monitoring system 1116 identifies potential security threats and attack behavior perpetrated via a particular network connection based on the type and quantity of network traffic exchanged via the connection. In some embodiments, the security monitoring system 1116 analyzes network traffic data representing the type and quantity of network traffic exchanged via a connection between a first computing device and a second computing device, where the first and second computing devices may include one or more client devices 102 and/or one or more host devices 106. In some embodiments, the network traffic data includes information regarding the types and amounts of data exchanged via the connection, such as through packets of data.

The network traffic data may be in any technically feasible format, including, without limitation, raw machine data, event data derived from the raw machine data as further described herein, metadata regarding data packets exchanged via the connection, data packets, portions of data packets, such as packet headers, any forms of metadata regarding the network traffic, or any other form of data from a data source. The network traffic data may be accessed from log files associated with client devices 102, log files associated with host devices 106, packet capture data derived from message traffic over networks 104, or any other technically feasible real-time or archived data source for data representing network traffic exchanged via network connections. In some embodiments, the security monitoring system 1116 analyzes network traffic data as network traffic is exchanged in real-time via the connection. In some embodiments, the security monitoring system 1116 analyzes network traffic data that is stored and/or archived, such as stored in one or more network traffic data log files generated by one or more client devices 102 and/or one or more host devices 106.

The security monitoring system 1116 identifies network traffic metrics from the accessed network traffic data to determine parameters and/or metrics representing properties of the network traffic, such as data packets, exchanged via the network connection. The security monitoring system 1116 categorizes the network connection depending on the values of the network traffic metrics for the connection by determining that the network traffic metrics correspond to one or more particular network connection behavior profiles. The security monitoring system 1116 detects potential security threats to the connection depending on the categorization of the connection and the metrics indicating the types and amounts of data being exchanged via the connection. Upon detecting a potential security threat, the security monitoring system 1116 initiates a mitigation action, such as sending an alert to a user or operator of the computer network, indicating the existence of a potential security threat. In this manner, the security monitoring system 1116 determines information about the connection based on the types and amounts of data and/or packets exchanged via the connection. Further, the security monitoring system 1116 detects potential security threats without analyzing the specific content of the data or packets exchanged via the connection or analyzing the total volume of all transactions exchanged via the connection.

The security monitoring system 1116 in the networked computer environment 1100 is represented as implemented via a separate system in FIG. 11. Those skilled in the art will understand that FIG. 11 represents one example of a networked computer system, and other embodiments may use different arrangements, including arrangements in which the security monitoring system 1116 is implemented, completely or in part, within any one of or any combination of client devices 102, host devices 106, and the data intake and query system 108. For example, as shown in FIG. 11, a monitoring component 112 could be included as a client application 110 within one of client devices 102, and this monitoring component 112 could be executed in conjunction with the security monitoring system 1116, such that the client devices 102 could be implemented as part of the security monitoring system 1116. Those skilled in the art will understand that such a monitoring component 112 may be implemented in any computing device or system, such as one or more client devices 102, one or more host devices 106, and/or the data intake and query system 108.

Figure 12:
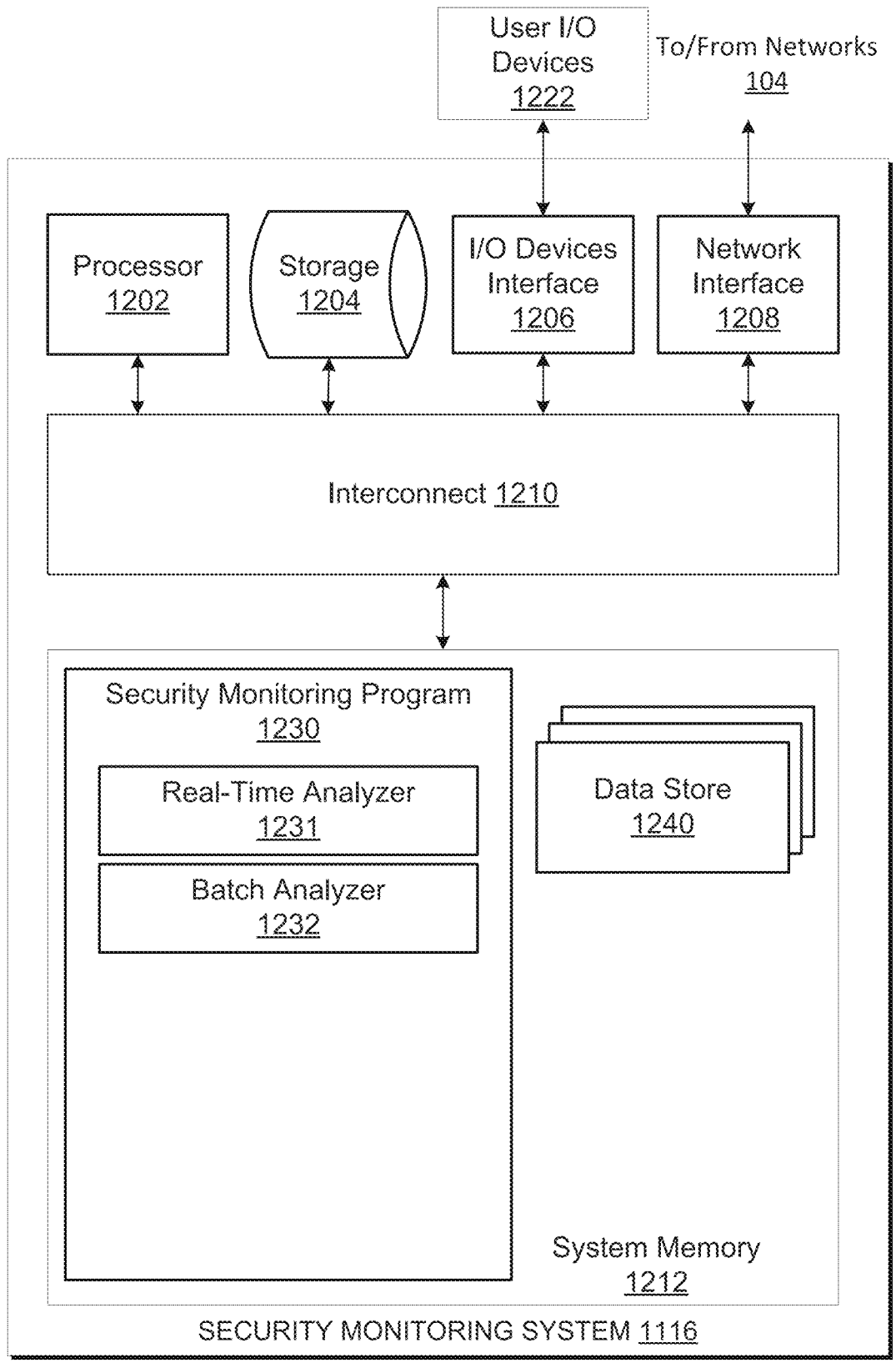
FIG. 12 is a more detailed illustration of the security monitoring system of FIG. 11 in accordance with the disclosed embodiments.

FIG. 12 is a more detailed illustration of the security monitoring system 1116 of FIG. 11 in accordance with the disclosed embodiments. As shown, the security monitoring system 1116 includes, without limitation, a processor 1202, storage 1204, an input/output (I/O) device interface 1206, a network interface 1208, an interconnect 1210, and a system memory 1212. The computer system 100 of FIG. 1 can be configured to implement the security monitoring system 1116. The processor 1202, storage 1204, I/O device interface 1206, network interface 1208, interconnect 1210, and system memory 1212 function substantially the same as described in conjunction with FIG. 1 except as further described below.

In general, processor 1202 retrieves and executes programming instructions stored in the system memory 1212. Processor 1202 may be any technically feasible form of processing device configured to process data and execute program code. Processor 1202 could be, for example, a central processing unit (CPU), a graphics processing unit (GPU), an application-specific integrated circuit (ASIC), a field-programmable gate array (FPGA), and so forth. Processor 1202 stores and retrieves application data residing in the system memory 1212. Processor 1202 is included to be representative of a single CPU, multiple CPUs, a single CPU having multiple processing cores, and the like. In operation, processor 1202 is the master processor of security monitoring system 1116, controlling and coordinating operations of other system components. System memory 1212 stores software applications and data for use by processor 1202. Processor 1202 executes software applications stored within system memory 1212 and optionally an operating system. In particular, processor 1202 executes software and then performs one or more of the functions and operations set forth in the present application.

The storage 1204 may be a disk drive storage device. Although shown as a single unit, the storage 1204 may be a combination of fixed and/or removable storage devices, such as fixed disc drives, floppy disc drives, tape drives, removable memory cards, or optical storage, network attached storage (NAS), or a storage area-network (SAN). Processor 1202 communicates to other computing devices and systems via network interface 1208, where network interface 1208 is configured to transmit and receive data via a communications network.

The interconnect 1210 facilitates transmission, such as of programming instructions and application data, between the processor 1202, input/output (I/O) devices interface 1206, storage 1204, network interface 1208, and system memory 1212. The I/O devices interface 1206 is configured to receive input data from user I/O devices 1222. Examples of user I/O devices 1222 may include one or more buttons, a keyboard, and a mouse or other pointing device. The I/O devices interface 1206 may also include an audio output unit configured to generate an electrical audio output signal, and user I/O devices 1222 may further include a speaker configured to generate an acoustic output in response to the electrical audio output signal. Another example of a user I/O device 1222 is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

The system memory 1212 includes, without limitation, a security monitoring program 1230 and a data store 1240. The security monitoring program 1230, in turn, includes, without limitation, a real-time analyzer 1231 and a batch analyzer 1232.

The real-time analyzer 1231 accesses streaming data from the interconnect 1210 of the security monitoring system 1116. The real-time analyzer 1231 receives streaming data from one or more client devices 102 and/or one or more host devices 106 via one or more networks 104, where the streaming data includes information regarding the network traffic exchanged via the network connection. The streaming data is accessible from log files associated with client devices 102 and/or host devices 106, packet capture data derived from message traffic over networks 104, or any other technical feasible data source. The real-time analyzer 1231 analyzes streaming data in real-time as the streaming data received by the security monitoring system 1116 in order to detect anomalies, threat indicators and threats.

In addition, in some embodiments, the real-time analyzer 1231 formats the streaming data and provides the formatted data to the batch analyzer 1232 for further detecting anomalies, threat indicators and threats. In some embodiments, while information is provided to the real-time analyzer 1231 in a streaming, record-by-record manner, logs of such information may be provided to the batch analyzer in the form of batches of data, where each batch of event data contains a collection of events that arrived over the batch period. In addition to the receiving data from the real-time analyzer 1231 receives, the batch analyzer 1232 receives additional historical event data from the security monitoring system 1116, prior analysis results, the model states, and other supporting data from the real-time analyzer 1231.

In some embodiments, the real-time analyzer 1231 and the batch analyzer 1232 may employ machine learning models to evaluate and analyze data. In some embodiments, the real-time analyzer 1231 and the batch analyzer 1232 may also employ other suitable forms of analysis, including, without limitation, rule-based analysis, algorithm-based analysis, and statistical analysis. In some embodiments, the real-time analyzer 1231 and the batch analyzer 1232 each produce one or more risk scores based on heuristics that assess the likelihood that one or more computing devices, such as client devices 102, host devices, 106, or any technically feasible computing devices, have been adversely affected by malicious software. In some embodiments, the real-time analyzer 1231 and the batch analyzer 1232 may be included in a data analysis and processing architecture that is optimized to process large amounts of data in both a streaming and batch processing in parallel. Such a streaming and batch processing architecture may be referred to as a lambda architecture.

Those skilled in the art will understand that parts or all of the security monitoring program 1230 and/or the real-time analyzer 1231 may be executed or implemented in some manner to monitor network traffic data in real-time. Thus, when referring to monitoring network traffic data in real-time, those skilled in the art will understand that referring to the security monitoring program 1230 refers to parts or all of the security monitoring program 1230 and/or parts or all of the real-time analyzer 1231.

Further, those skilled in the art will understand that parts or all of the security monitoring program 1230 and/or the batch analyzer 1232 may be executed or implemented in some manner to analyze batches or logs of historical or archived network traffic data, such as network traffic data stored in the data store 1240. Thus, when referring to analyzing historical or archived network traffic data, those skilled in the art will understand that referring to the security monitoring program 1230 refers to parts or all of the security monitoring program 1230 and/or parts or all of the batch analyzer 1232.

In some embodiments, the data store 1240 stores the network traffic data in some form, including, without limitation, raw machine data, event data derived from the raw machine data as further described herein, metadata regarding data packets exchanged via the connection, data packets, portions of data packets, such as packet headers, any forms of metadata regarding the network traffic, or any other form of data from a data source. In some embodiments, information regarding the network traffic exchanged via the connection may include streaming data, also referred to herein as recorded information, from one or more client devices 102 and/or host devices 106. The streaming data may include log files associated with client devices, packet capture data derived from message traffic over a computer network, or any other technical feasible data source.

The security monitoring program 1230 is capable to receive and analyze data that is part of an event is referred to herein as "event data" and stored within the data intake and query system 108. In addition, the security monitoring program 1230 is capable to receive and analyze raw machine data, such as data received or retrieved from one or more system log files, streams of network packet data, sensor data, application program data, error logs, stack traces, system performance data, and so on. The streaming data may be in any technically feasible format, including, without limitation, raw machine data or Splunk events. In some embodiments, the security monitoring program 1230 may perform an extract, transform, and load (ETL) process on the incoming streaming data to generate data in a format that is amenable to further analysis by the real-time analyzer 1231 and the batch analyzer 1232. In so doing, security monitoring program 1230 may remove or otherwise filter streaming data that is not relevant to security threat detection while retaining relevant streaming data. The security monitoring program 1230, including the real-time analyzer 1231 and the batch analyzer 1232, is now described in further detail.

The security monitoring program 1230 receives and analyzes network traffic data representing network traffic exchanged over the connection. In some embodiments, the security monitoring program 1230 may receive the network traffic data via the interconnect 1210, and the interconnect 1210 may receive the network traffic data from one or more networks 104 via the network interface 1208. The network traffic data represents information exchanged over a network connection between one or more client devices 102 and/or one or more host devices 106, where the network traffic data includes information regarding the types and amounts of data exchanged via the connection. In some embodiments, the security monitoring program 1230 may identify network traffic metrics from the accessed data to indicate parameters and/or metrics for the data, such as data packets, exchanged via the network connection.

The security monitoring program 1230 categorizes the network connection depending on the values of the network traffic metrics for the connection. In some embodiments, the security monitoring program 1230 may detect potential security threats to the connection depending on the categorization of the connection and the types and amounts of data being exchanged via the connection. Upon detecting a potential security threat, the security monitoring program 1230 initiates a mitigation action, such as sending an alert to a user or operator of the computer network, indicating the existence of a potential security threat. In this manner, in some embodiments, the security monitoring program 1230 may determine information about the connection based on the types and amounts of data and/or packets exchanged via the connection. Further, in in some embodiments, the security monitoring program 1230 may detect potential security threats without analyzing the specific content of the data or packets exchanged via the connection or analyzing the total volume of all transactions exchanged via the connection.

In some embodiments, as a part of detecting potential security threats to the connection, the security monitoring program 1230 may receive and analyze second network traffic data representing subsequent or additional network traffic exchanged over the connection. In some embodiments, the security monitoring program 1230 may receive the second network traffic data via the interconnect 1210, and the interconnect 1210 may receive the second network traffic data from one or more networks 104 via the network interface 1208. As with the previous network traffic data, the second network traffic data represents information exchanged over a network connection between one or more client devices 102 and/or one or more host devices 106, where the network traffic data includes information regarding the types and amounts of data exchanged via the connection.

The security monitoring program 1230 identifies second network traffic metrics from the accessed second network traffic data to indicate parameters and/or metrics for the network traffic, such as data packets, exchanged via the network connection. In some embodiments, the security monitoring program 1230 may detect potential security threats to the connection by detecting deviations of the second network traffic metrics from previous network traffic metrics and/or deviations of the second network traffic metrics from behavior predicted by the previous categorization of the connection.

3.1. Analyze Received Network Traffic Data

The security monitoring program 1230 receives and analyzes network traffic data representing network traffic exchanged over the connection via the interconnect 1210, where the interconnect 1210 receives the network traffic data from one or more networks 104 via the network interface 1208. The network traffic data represents information exchanged over a network connection between one or more client devices 102 and/or one or more host devices 106, where the network traffic data includes information regarding the types and amounts of data exchanged via the connection. In some embodiments, the security monitoring program 1230 and/or the real-time analyzer 1231 may access network traffic received in real-time as the network traffic data is exchanged via the connection. In some embodiments, the security monitoring program 1230 and/or the batch analyzer 1232 may access one or more network traffic log files generated by one or more client devices 102 and/or one or more host devices 106.

The network traffic data may be in any technically feasible format, including, without limitation, raw machine data, event data derived from the raw machine data as further described herein, metadata regarding data packets exchanged via the connection, data packets, portions of data packets, such as packet headers, any forms of metadata regarding the network traffic, or any other form of data from a data source. The network traffic data may be accessed from log files associated with client devices 102, log files associated with host devices 106, packet capture data derived from message traffic over networks 104, or any other technically feasible real-time or archived data source for data representing network traffic exchanged via network connections.

In some embodiments, the network traffic data may include information about the packets exchanged via the network connection, including, without limitation, a network address of a source computing device where the packet originated, a network address of a destination computing device to which the packet is sent, a size of each packet exchanged, the number of bytes transmitted from a first computing device to a second computing device, the number of bytes transmitted from the second computing device to the first computing device, the total number of packets exchanged via the network connection, the duration of the network connection, the network communications protocol used for the information exchanged via the network connection, and a network port accessed on a particular computing device connected to the network connection.

In some embodiments, the received network traffic data may include, without limitation, fields such as a ClientBytes field indicating the number of bytes transmitted by a client computing device, a ServerBytes field indicating the number of bytes transmitted by a server computing device, a SourceBytes field indicating the number of bytes transmitted by a source computing device, a DestinationBytes field indicating the number of bytes transmitted by a destination computing device, a Bytes-In field indicating the number of bytes received by a computing device, or a Bytes-Out field indicating the number of bytes transmitted by a computing device.

3.2. Identify Metrics from the Received Network Traffic Data

From the received network traffic data, the security monitoring program 1230 identifies network traffic metrics representing various aspects of the connection and/or the data packets exchanged via the connection. In some embodiments, the security monitoring program 1230 performs an extract, transform, and load (ETL) process to identify the following metrics from the network traffic data.

3.2.1. Total Number of Bytes Exchanged Metric

In some embodiments, the security monitoring program 1230 may identify a network traffic metric representing a total number of bytes being exchanged via the connection in both directions included in the received network traffic data. In some embodiments, the security monitoring program 1230 may identify a total number of bytes metric from the received network traffic data. The total number of bytes metric may be measured in any data unit, such as bytes. In some embodiments, the received network traffic data may include two different fields indicating the number of bytes being transmitted via the connection in each of two directions. In such embodiments, the total number of bytes being exchanged in both directions may be identified by adding the number of bytes transmitted in each direction. For example, the number of bytes transmitted in one direction (e.g., from a first computing device to a second computing device) and the number of bytes transmitted in the opposite direction (e.g., from the second computing device back to the first computing device) could be added together to compute the total number of bytes exchanged in both directions.

3.2.2. Total Number of Packets Exchanged Metric

In some embodiments, the security monitoring program 1230 may identify a network traffic metric representing a total number of packets exchanged via the connection in both directions, where this metric is included in the received network traffic data. In some embodiments, the security monitoring program 1230 may identify a total number of packets metric from the received network traffic data. In some embodiments, when the received network traffic data includes two different fields indicating the number of packets being transmitted via the connection in each of two directions, the metric for the total number of packets being exchanged in both directions may be identified by adding these two numbers indicating the number of packets transmitted in each direction. For example, the number of packets transmitted in one direction (e.g., from a first computing device to a second computing device) and the number of packets transmitted in the opposite direction (e.g., from the second computing device back to the first computing device) could be added together to compute the total number of packets exchanged in both directions. In some embodiments, the security monitoring program 1230 may identify the total number of packets metric by counting the number of packets included among the network traffic exchanged via the connection.

3.2.3. Duration of Connection Metric

In some embodiments, the security monitoring program 1230 may identify a network traffic metric representing the duration of a network connection, where this duration metric is included in the received network traffic data. In some embodiments, the security monitoring program 1230 may identify the duration metric from the received network traffic data, such as by subtracting a latest timestamp indicated in the network traffic data minus an earliest timestamp indicated in the network traffic data. In some embodiments, the duration metric may be identified in any technically feasible manner from the network traffic data.

The duration of the connection indicates the longevity of the network connection and may be measured in any time unit, such as seconds. Oftentimes, a network connection may be ended by either side of the connection, so the duration of the network connection may indicate a patience or a persistence by one or both sides of the network connection. For example, a long duration of a connection indicates that the connection persists and is not ended at certain instances during the existence of the connection, such as when there is no information being transmitted via the connection for a period of time. In addition, a long duration of a connection may indicate that the connection is interactive, with several interactions between different computing devices over a long period of time. Moreover, a long duration of a connection may indicate that the connection may be a user interface or other connection with a high longevity, such as an authenticated channel, a phone home connection, or a dead man switch connection.

3.2.4. Efficiency Metric (Average Packet Size)

In some embodiments, the security monitoring program 1230 may identify a network traffic metric representing an efficiency of the network connection by determining an average size of a packet exchanged via the network connection from the received network traffic data. The efficiency or average packet size metric may be indicated and measured in any unit of data, such as bytes. In some embodiments, the efficiency or average packet size metric may be identified by dividing the total number of bytes exchanged via the connection (in both directions) by a total number of packets exchanged via the connection (in both directions). In some embodiments, when the network traffic data includes information indicating the size of each packet exchanged via the connection, the efficiency or average packet size metric may be identified by calculating an average of all packet sizes indicated in the network traffic data. In some embodiments, the efficiency or average packet size metric may be identified in any technically feasible manner from the network traffic data. The efficiency or average packet size metric may be rounded to the nearest integer to increase efficiency of processing the metric.

In some embodiments, the efficiency or average packet size metric may indicate the overall efficiency of the network connection. Since each computing device expends a certain amount of overhead to create each packet, a computing device may seek to transmit as much data as possible in each packet in order to transmit as few packets as possible, thereby increasing efficiency by reducing overhead.

In addition, in some embodiments, a computing device may include a write buffer for storing information to be transmitted via the connection. Further, when transmitting data, the computing device may transmit a packet containing all data included in the write buffer periodically every predetermined number of clock cycles, regardless of how much data is stored in the write buffer. In such embodiments, when the write buffer is filled quickly, such as for a connection of high efficiency, each packet may be transmitted with a large or maximum size. By contrast, when the write buffer is filled slowly, such as for a connection of low efficiency, each packet may be transmitted at every predetermined periodic interval, regardless of how little data may be included in the write buffer. In such connections having a low efficiency where the write buffer is filled slowly, packets transmitted may have a very small size.

An example of a connection of high efficiency could be a connection for transmitting a data stream, such as when a user is streaming audio or video data. For such connections involving transmitting a data stream, a computing device could transmit packets of maximum size, thus exhibiting a very high average packet size and indicating an efficient connection. Similarly, another example of a connection of high efficiency could be a connection for a file transfer where a data file is being transferred. For such connections involving transferring a file, a computing device could transmit packets of maximum size. In some embodiments, the recipient computing device may transmit small acknowledgment (or ACK) packets acknowledging that the data packets have been received. In some embodiments, such ACK packets have a small and/or predetermined size. Such connections for file transfers may also exhibit an overall high average packet size, also indicating an efficient connection, although the number of small ACK packets being exchanged may reduce the overall average packet size below a maximum.

By contrast, in some embodiments, an example of a connection of lower efficiency may be a connection with a large amount of human interactivity, such as when a human is selecting or inputting information to be transmitted via the connection. For example, when a human is manually typing information to be transmitted by a computing device via the connection, the computing device may transmit a packet every periodic interval of a predetermined number of clock cycles, in which case the human may only be able to type a few characters before the next packet is sent. In such embodiments, the packets transmitted containing the manually typed information may be very small and may contain only a few characters of data in each packet. By contrast, when a connection is interacting with an automated program, such as a script executing on a computing device, the automated program may generate data much more quickly than a human typing information. In such cases of interacting with an automated program, the packets generated by the automated program may be much larger than the packets generated by human interaction.

3.2.5. Responsiveness Metric (Packets Exchanged Per Second (PPS))

In some embodiments, the security monitoring program 1230 may identify a network traffic metric representing a responsiveness of the computing devices at either end of the connection by determining a number of packets exchanged via the network connection per second (PPS) from the received network traffic data. In some embodiments, the responsiveness or number of packets per second metric may be calculated by dividing a total number of packets exchanged via the connection (in both directions) by the duration of the connection. In some embodiments, the responsiveness or packets per second metric may be identified in any technically feasible manner from the network traffic data.

In some embodiments, the responsiveness or number of packets transmitted per second metric may indicate an overall responsiveness of the connection, or how quickly each side of the connection responds in exchanges of information via the connection. For example, a connection with a large amount of interactivity could exhibit a low value of the number of packets exchanged per second. By contrast, a connection with automated interactions, such as a connection between two automated processes executing on computing devices, could exhibit a high value of the number of packets exchanged per second.

In some embodiments, during each interaction, a gap may exist in between successive responses, where this gap may cause the number of packets transmitted per second to decrease. In some embodiments, this gap between responses may be equal to two times a latency of the connection, plus a response time for formulating the response, where the latency of the connection is the total transmission time from one end of the connection to the other end of the connection. In some embodiments, when a user on one side of the connection is interacting with the other side of the connection, such as a user surfing the web, a request signal from the other side of the connection may expend the latency time traveling from the other side of the connection to the user. Subsequently, the user may consume a particular amount of time to formulate a response signal, such as taking a certain length of time to decide on a link to click. Further, the response signal formulated by the user may consume another latency time to travel from the user to the other end of the connection. In such embodiments, a gap in between actions by the computing device may be equal to double the latency of the connection, plus the response time of the user. Such connections may exhibit long gaps in between responses, and thus the number of packets exchanged per second may be relatively low.

Further, in some embodiments, similar to the duration metric, a low value of the number of packets exchanged per second may also indicate a patient or persistent connection, where the connection persists even though not many packets are being exchanged via the connection per second. In such embodiments, the connection may remain open, even though no packets or a small number of packets are being exchanged, and thus the number of packets exchanged per second may be relatively low.

3.2.6. Symmetry/Byte Ratio Metric

In some embodiments, the security monitoring program 1230 may identify a network metric representing a symmetry of the connection from the received network traffic data. In some embodiments, this symmetry metric indicates the ratio of bytes transmitted in one direction via the connection versus the total number of bytes exchanged via the connection. In some embodiments, the symmetry metric indicates the byte ratio of the number of bytes transmitted in one direction via the connection versus the number of bytes transmitted in the opposite direction via the connection. In some embodiments, the symmetry metric may be identified in any technically feasible manner from the network traffic data.

In some embodiments, the symmetry may be calculated by dividing the number of bytes transmitted via the connection in one direction by the total number of bytes transmitted via the connection (in both directions), times 100, minus 50. In such embodiments, the number of bytes transmitted via the connection in one direction divided by the total number of bytes transmitted via the connection (in both directions) represents the fraction of data transmitted via the connection in one direction. Multiplying this number by 100 results in the percentage of data transmitted in the one direction. Subtracting 50 from the percentage value results in a symmetry value that may vary between −50 and +50, where the sign of the symmetry indicates the net direction of the data being exchanged. In some embodiments, the symmetry metric may be calculated from the point of view of a host or server computing device, where a negative symmetry may indicate that a majority of data exchanged via the connection is received by the host or server computing device, and a positive symmetry may indicate that a majority of data exchanged via the connection is transmitted by the host or server computing device. In some embodiments, the symmetry may be calculated from the point of view of a client computing device, where a negative symmetry metric value may indicate that a majority of data exchanged via the connection is received by the client computing device, and a positive symmetry metric value may indicate that a majority of data exchanged via the connection is transmitted by the client computing device.

In some embodiments, by subtracting 50 during the calculation of the symmetry, to make the symmetry metric vary from −50 to +50, instead of from 0 to 100, such a symmetry metric may be used to indicate the degree to which the connection is asymmetric. For example when no data packets are transmitted in a first direction and all of the data packets are transmitted in a second direction, the symmetry metric would have a value of −50. Conversely, when all data packets are transmitted in the first direction and no data packets are transmitted in the second direction, the symmetry metric would have a value of +50. By contrast, when an equal amount of data is transmitted in each of the two directions associated with the connection, the symmetry metric would have a value of 0. In all of these circumstances, the magnitude of the symmetry metric would indicate the degree to which more data is transmitted by one side of the connection than the other side of the connection. Thus, the magnitude of this symmetry metric could be calculated by computing the absolute value of the symmetry metric (Abs (symmetry), where Abs(x) denotes the absolute value of x), to indicate the degree to which the connection is asymmetric, where a small value of (Abs(symmetry)) indicates that the connection may be fairly balanced. By contrast, in such embodiments, a large value of (Abs(symmetry)) indicates that the connection may be asymmetric, where one side of the connection transmits relatively more data than the other side of the connection.

In some embodiments, by varying the symmetry metric from −50 to +50, programming logic for calculations which employ the value of this symmetry metric may be advantageously simplified. For example, security monitoring program 1230 could seek to detect when the symmetry metric (which varies between −50 and +50) is fairly balanced, such as when the symmetry metric is between −10 and +10. In some embodiments, such a determination may include performing one operation employing the absolute value of the symmetry metric, for example, by determining whether the absolute value of the symmetry metric is less than 10 (e.g., Abs(symmetry)<10). By contrast, in some embodiments, when employing a percentage value between 0 and 100 instead of the symmetry metric, such a fairly balanced connection may be detected by determining whether the percentage value is between 40 and 60. In some embodiments, such a determination may include performing two operations and performing a logical operation, for example, determining whether the percentage value is greater than 40 and less than 60 (e.g., (percentage >40) AND (percentage<60)). Thus, the symmetry metric described herein increases efficiency by simplifying the programming logic of calculations employing this symmetry metric in comparison to conventional metrics, such as fractional or percentage metrics.

3.3. Categorize the Connection

In some embodiments, from the identified network traffic metrics, the security monitoring program 1230 may categorize the network connection, by determining that the network traffic metrics correspond to one or more particular network connection behavior profiles. In some embodiments, the behavior of a connection may correspond to more than one behavior profile, and thus the connection may be categorized as corresponding to more than one network connection behavior profile at a time. The network connection behavior profiles include, without limitation, a transfer connection, a request/response connection, a human connection, a machine connection, a probe or probe/ACK connection, an interactive connection, a balanced connection, a reversed connection, and/or a behavior profile that may be determined adaptively based on past behavior of a connection. These network connection behavior profiles are now described in further detail.

3.3.1. Transfer Connection

In some embodiments, the security monitoring program 1230 may categorize a connection as a transfer connection when the network traffic metrics indicate that the connection has a behavior profile resembling a transfer, such as a data, stream, or file transfer. In some embodiments, a connection may be represented as a transfer connection via a directional parameter, having a value of zero for a connection that is not a transfer, a value of more than zero for a transfer in one direction, such as a download from a host or server computing device, and a value of less than zero for a transfer in the opposite direction, such as an upload to a host or server computing device. These designations may be mutually exclusive, in that, for example, a connection would not be able to be both a transfer in one direction and also a transfer in the opposite direction. For example, such a parameter could represent a level or a strength factor indicating an extent to which the connection resembles or corresponds to a request/response connection. In some embodiments, a connection may be represented as a transfer connection via any technically feasible method for designating the connection, including, without limitation, one or more parameters, flags, or any other technically feasible indicators.

In some embodiments, a connection is categorized as corresponding to a transfer when the metrics associated with the connection exhibit a relatively large amount of asymmetry and a relatively high degree of efficiency, with little to no interactivity. For example, connections exchanging at least 10 kilobytes (kbytes) are categorized as a transfer if the connections have a large asymmetry, such as a magnitude of a symmetry metric over a certain threshold (e.g., Abs (symmetry) of at least 30). Further, such connections are categorized as a transfer if the connections have a large efficiency metric or average packet size, such as an average packet size over a certain threshold (e.g., at least 700 bytes per packet), indicating a very high efficiency connection. In some embodiments, connections exchanging less than 10 kbytes may have slightly different connection metrics. For example, such connections are categorized as a transfer if the asymmetry is very large, such as a symmetry metric over a large threshold (e.g., Abs(symmetry) of at least 40). Further, such connections are categorized as a transfer when the efficiency metric or average packet size is over a certain threshold (e.g., 500 bytes per packet), indicating a high efficiency connection, and the duration of the connection is under a certain threshold, such as when the duration of the connection is very short (e.g., duration is less than 5 seconds).

In addition, in some embodiments, if a connection is categorized as corresponding to a transfer, then the security monitoring program 1230 may designate a separate data transfer metric indicating the number of bytes transmitted by a dominant side of the connection, such as the side of the connection that transmits the majority of the data exchanged via the connection. In another example, the security monitoring program 1230 may designate that the data transfer metric indicates the total number of bytes exchanged via the connection. Specifically, in some embodiments, the security monitoring program 1230 may use the data transfer bytes metric to identify the number of bytes exchanged via the connection that acts as a transfer. In some embodiments, denoting a separate metric for data transfer bytes only for transfer connections may increase the accuracy and efficiency of evaluating connections for certain types of security threats, as described in further detail herein.

3.3.2. Request/Response Connection

In some embodiments, the security monitoring program 1230 may categorize a connection as a request/response connection when the network traffic metrics for the connection indicate that the connection has a behavior profile resembling a request and response. In some embodiments, a request/response connection may represent a user surfing the web, in which the user may make requests, such as by requesting web pages, and receive data in response, such as when the user receives web page data. In some embodiments, a connection may be represented as a request/response connection via a parameter, having a value of zero for a connection that is not a request/response and a value of greater than zero for a request/response. For example, such a parameter could represent a level or a strength factor indicating an extent to which the connection resembles or corresponds to a request/response connection. In some embodiments, a connection may be represented as a request/response connection via any technically feasible method for designating the connection, including, without limitation, one or more parameters, flags, or any other indicators.

In some embodiments, a connection may be categorized as a request/response connection if the connection corresponds to a transfer connection in which a total of less than 10 kbytes are exchanged. In some embodiments, a connection may be categorized as corresponding to a request/response when the metrics associated with the connection exhibit a great amount of efficiency, a short duration, and a small amount of data exchanged via the connection.

For example, a connection could be classified as a request/response connection if the connections have metrics of a very large efficiency metric or average packet size, such as an average packet size over a certain threshold (e.g., more than 800 bytes per packet), thus indicating a high efficiency connection, and a duration under a certain threshold, such as a connection with a short duration (e.g., at most 5 seconds). Further, such connections could exhibit a medium amount of asymmetry, such as a symmetry metric within a certain range (e.g., Abs(symmetry) from 8 to 40), and a small total amount of data being exchanged, such as an amount of data under a certain threshold (e.g., total bytes of less than 10 kbytes). In another example, connections could be categorized as a request/response if the connections have metrics of a large efficiency metric or average packet size, such as an average packet size over a certain threshold (e.g., more than 500 bytes per packet), and a duration under a certain threshold, such as a connection with a short duration (e.g., at most 5 seconds). Further, such connections could exhibit a large amount of asymmetry, such as a magnitude of a symmetry metric over a certain threshold (e.g., Abs(symmetry) of at least 40), and a small total amount of data being exchanged, such as an amount of data under a certain threshold (e.g., total bytes of less than 10 kbytes).

3.3.3. Human Connection

In some embodiments, the security monitoring program 1230 may categorize a connection as a human connection when the network traffic metrics for the connection indicate that the connection has a behavior profile resembling a human, such as a human user inputting data into a computing device as part of the connection. In some embodiments, a connection may be represented as a human via a parameter, having a value of zero for a connection that is not a human and a value of more than zero for a connection that resembles or corresponds to a human. For example, such a parameter could represent a level or a strength factor indicating an extent to which the connection resembles or corresponds to a human connection. In some embodiments, a connection may be represented as a human connection via any technically feasible method for designating the connection, including, without limitation, one or more parameters, flags, or any other indicators.

In some embodiments, a connection may be categorized as corresponding to a human connection when the metrics associated with the connection indicate that the connection exhibits behaviors that represent a human interacting at least at one end of the connection. Specifically, humans generally react orders of magnitude more slowly than machines, and computer processes which involve human actions generally consume a longer amount of time than and have different properties from automated computer interactions.

For example, connections could be categorized as representing human behavior if the metrics fall into certain behavior patterns. For example, the security monitoring program 1230 could categorize the connection as a human connection if the connection exhibits a long duration, such as a duration over a certain threshold (e.g., at least 30 seconds). Further, such connections could have, a low symmetry metric, such as a magnitude of a symmetry under a certain threshold (e.g., Abs(symmetry) of less than 5), an efficiency metric or average packet size in a certain range (e.g., an average packet size between 200 and 800 bytes), and a small responsiveness metric or number of packets per second, such as a PPS of under a certain threshold (e.g., PPS of less than 5). More particularly, in some embodiments, such connections could exist for a long period of time, indicating that a human is consuming a longer amount of time to interact or enter data relative to an automated computer interaction, and a small number of packets are exchanged per second, indicating that data is being entered slowly by a human, rather than by a computer. In some embodiments, the security monitoring program 1230 may analyze only connections that exchange more than a certain threshold amount of data (e.g., at least 30 kbytes), where connections that exchange less than the threshold amount of data may be difficult to categorize reliably.

3.3.4. Machine Connection

In some embodiments, the security monitoring program 1230 may categorize a connection as a machine connection when the network traffic metrics for the connection indicate that the connection has a behavior profile resembling a machine, such as a computing device executing a computer program or script to exchange data via the connection. In some embodiments, a connection may be represented as a machine connection via a parameter, having a value of zero for a connection that is not a machine and a value of more than zero for a connection that resembles or corresponds to a machine. For example, such a parameter could represent a level or a strength factor indicating an extent to which the connection resembles or corresponds to a machine connection. In some embodiments, a connection may be represented as a machine connection via any technically feasible method for designating the connection, including, without limitation, one or more parameters, flags, or any other indicators.

In some embodiments, a connection may be categorized as corresponding to a machine connection when the metrics associated with the connection exhibit behaviors that represent a machine interacting at both ends of the connection. Specifically, machines generally react orders of magnitude more quickly than humans, and computer processes which are satisfied by automated machine actions generally react more quickly than human interactions, including transmitting more packets per second than human interactions.

For example, connections could be categorized as representing machine behavior if the connections have at least a medium amount of asymmetry, such as a magnitude of a symmetry metric over a certain threshold (e.g., Abs(symmetry) of more than 5), have an average packet size that under a certain threshold (e.g., average packet size of less than 600), and a responsiveness metric or packets per second that is over a certain threshold (e.g., PPS is more than 5). More particularly, in some embodiments, such connections may exchange packets and may react more quickly than human interactions, indicating that a machine is responding quickly and taking a much shorter time than a human to interact or enter data to transmit into various packets. In some embodiments, the security monitoring program 1230 may analyze only connections that exchange more than a certain threshold amount of data (e.g., at least 30 kbytes), where connections that exchange less than the threshold amount of data may be difficult to categorize reliably.

3.3.5. Probe or Probe/ACK Connection

In some embodiments, the security monitoring program 1230 may categorize a connection as a probe or a probe/ACK connection when the network traffic metrics for the connection indicate that the connection has a behavior profile resembling probing behavior. In some embodiments, a connection may exhibit probe or probe/ACK behavior when the connection represents an exchange of a small number of packets to probe one or more ports of a computing device, such as when an attacker is seeking a way to connect to a computing device. In some embodiments, a connection may represent an exchange of a small number of packets via a single port of a computing device. In some embodiments, one or more connections may represent an exchange of a small number of packets via more than one port of a computing device. A probe/ACK connection may differ from a probe connection in that, for a probe/ACK connection, at least one packet is transmitted in each direction, including at least one probe packet in one direction and at least one acknowledgment (ACK) packet in the other direction. For example, two computing devices could engage in information exchange with a minimum of transmitting a single packet in each direction.

In some embodiments, a connection may be represented as a probe via a parameter, having a value of zero for a connection that is not a probe and a value of more than zero for a probe, or a connection may be represented as a probe/ACK via a different parameter, having a value of zero for a connection that is not a probe/ACK and a value of more than zero for a probe/ACK. For example, such a parameter may represent a level or a strength factor indicating an extent to which the connection resembles or corresponds to a probe or a probe/ACK connection. In some embodiments, a connection may be represented as a probe connection via a flag, having a value of zero for a connection that is not a probe and a value of 1 for a connection that is a probe. Similarly, a connection may be represented as a probe/ACK connection via a different flag, having a value of zero for a connection that is not a probe/ACK and a value of 1 for a connection that is a probe/ACK. In such embodiments, the flags indicating probe or probe/ACK connections may be stored and counted, in order to determine the amount of probe or probe/ACK activity over time. In some embodiments, a connection may be represented as a probe or a probe/ACK connection via any technically feasible method for designating the connection, including, without limitation, one or more parameters, flags, or any other indicators.

In some embodiments, the security monitoring program 1230 may categorize a connection as corresponding to a probe or a probe/ACK when the metrics associated with the connection indicate behaviors that represent a small number of packets being exchanged. For example, connections could be categorized as representing probe behavior when the connections exchange a small number of packets, such as a number of packets under a certain threshold (e.g., total packets exchanged is from 1 to 3). In addition, in some embodiments, connections may be categorized as representing probe/ACK behavior if the connections exchange a small number of packets (e.g., total packets exchanged is between 2 and 3).

3.3.6 Interactive Connection

In some embodiments, the security monitoring program 1230 may categorize a connection as an interactive connection when the network traffic metrics for the connection indicate that the connection has a behavior profile resembling interactive behavior. In some embodiments, a connection may exhibit interactive behavior when the connection represents a significant level of interaction and data dependencies, for example, when one side of the connection waits for or depends on data from the other side of the connection for formulating a response. In some embodiments, a connection may be represented as an interactive connection via a parameter, having a value of zero for a connection that is not interactive and a value of more than zero for an interactive connection. For example, such a parameter could represent a level or a strength factor indicating an extent to which the connection resembles or corresponds to an interactive connection. In some embodiments, a connection may be represented as an interactive connection via any technically feasible method for designating the connection, including, without limitation, one or more parameters, flags, or any other indicators.

In some embodiments, the security monitoring program 1230 may categorize a connection as corresponding to an interactive connection when the metrics associated with the connection indicate that the connection exhibits behaviors that represent a large number of interactions between the different ends of the connection. Such interactions generally consume a particular gap length of time between interactions, where, as described herein, a gap in between interactions may be equal to the latency of the connection times two, plus the response time for formulating the response. Thus, in some embodiments, interactive connections may have large durations, since there are generally gaps in between interactions to extend the duration of the connection.

For example, for connections exchanging a small amount of data, such as an amount of data under a certain threshold (e.g., less than 10 kbytes), the security monitoring program 1230 could categorize connections as interactive if the connection exhibits a certain amount of symmetry, such as a magnitude of a symmetry metric under a certain threshold (e.g., Abs(symmetry) of less than 8) and has a sufficient duration, such as a duration over a certain threshold (e.g., more than 5 seconds). Further, such connections exchanging an amount of data under a certain threshold (e.g., less than 10 kbytes) could be categorized as representing interactive behavior when the connection has an efficiency metric or average packet size in a certain range (e.g., average packet size of between 220 and 400 bytes per packet) and exhibits a certain amount of asymmetry, such as a magnitude of a symmetry metric in a certain range (e.g., Abs(symmetry) of between 8 and 40).

In another example, for connections exchanging a larger amount of data, such as an amount of data over a certain threshold (e.g., at least 30 kbytes), the security monitoring program 1230 could also categorize connections as interactive if the connection exhibits a very long duration, such as a duration over a certain threshold (e.g., at least 30 seconds). Further, such connections may also have a low symmetry metric, such as a magnitude of a symmetry metric under a certain threshold (e.g., Abs(symmetry) of less than 5) and an efficiency metric or average packet size in a certain range (e.g., between 200 and 800 bytes per packet). Further, such connections exchanging a larger amount of data, such as an amount of data over a certain threshold (e.g., at least 30 kbytes), the security monitoring program 1230 could also categorize connections as interactive if the connection exhibits either (1) an efficiency metric or average packet size under a certain threshold (e.g., less than 200 bytes per packet) and a responsive metric or packets per second (PPS) over a certain threshold (e.g., a PPS over 5 packets per second), or (2) an efficiency metric or average packet size in a certain range (e.g., between 200 and 600 bytes per packet) and a high symmetry metric, such as a magnitude of a symmetry metric over a certain threshold (e.g., Abs(symmetry) of greater than 5).

3.3.7. Balanced Connection

In some embodiments, the security monitoring program 1230 categorizes a connection as a balanced connection when the network traffic metrics for the connection indicate that the connection has a behavior profile resembling an exchange that is fairly symmetrical, such as when each side of the connection exchanges roughly a similar amount of data. In some embodiments, a connection may be represented as a balanced connection via a parameter, having a value of zero for a connection that is not a balanced connection and a value of more than zero for a balanced connection. For example, such a parameter could represent a level or a strength factor indicating an extent to which the connection resembles or corresponds to a balanced connection. In some embodiments, a connection may be represented as a balanced connection via any technically feasible method for designating the connection, including, without limitation, one or more parameters, flags, or any other indicators.

In some embodiments, the security monitoring program 1230 categorizes a connection as a balanced connection when the metrics associated with the connection indicate that the connection exhibits behaviors that represent a fairly symmetrical amount of data being exchanged in each direction via the connection. In one example, for connections exchanging a large amount of data, such as an amount of data over a certain threshold (e.g., at least 30 kbytes), the security monitoring program 1230 may categorize a connection as balanced if the connection exhibits a small amount of asymmetry, such as a magnitude of a symmetry metric under a certain threshold (e.g., Abs(symmetry) of less than 5). In another example, for connections exchanging a small amount of data, such as an amount of data under a certain threshold (e.g., less than 10 kbytes), the security monitoring program 1230 may categorize a connection as balanced if the connection exhibits a small amount of asymmetry, such as a magnitude of a symmetry metric under a certain threshold (e.g., Abs(symmetry) of less than 8).

3.3.8. Reversed Connection

In some embodiments, the security monitoring program 1230 may categorize a connection as a reversed connection when the network traffic metrics for the connection indicate that the connection has a behavior profile resembling an exchange that is generally in "reverse." In some embodiments, a connection may be represented as a reversed connection via a parameter, having a value of zero for a connection that is not a reversed connection and a value of more than zero for a reversed connection. For example, such a parameter could represent a level or a strength factor indicating an extent to which the connection resembles or corresponds to a reversed connection. In some embodiments, a connection may be represented as a reversed connection via any technically feasible method for designating the connection, including, without limitation, one or more parameters, flags, or any other indicators.

In some embodiments, the security monitoring program 1230 may categorize a connection as a reversed connection when the metrics associated with the connection indicate that the connection exhibits behaviors that represent a connection in reverse. In some embodiments, a host or server computing device, such as a web server, may generally transmit more data than a client device, such as a user surfing the web. For example, for some communications protocols, a request is transmitted by a client device, and a response transmitted by a host or server device could include the initial request as well as the host computer's response.

In such embodiments, the host or server device may normally transmit more data than the client device, since the client device's communications would include the request, and the host device's communications would include both the request and the response. Thus, such a connection may be characterized as being in reverse when the connection is reversed, such as when the client device transmits a larger amount of data than the host or server device to which the client device is connected. For example, for connections having a negative asymmetry, such as a symmetry metric under a certain threshold (e.g., less than −5), a connection could be characterized as a reversed connection. As described herein, a summary of various network connection behavior profiles according to various embodiments is shown in Table 1.

3.3.9. Summary Table of Categories and Exemplary Metrics

Table 1, shown below, illustrates, without limitation, a summary of various exemplary metrics associated with various categorizations according to various embodiments.

TABLE 1

| Packets Per Second (PPS) | Average Packet Size (bytes) | Abs (Symmetry) | Duration (seconds) | Total Bytes | Total Packets | Determination |
|---|---|---|---|---|---|---|
| | | | | | ≤3 | Probe |
| | | | | | 2 | Balanced |
| | | | | | Between 2 and 3 | ProbeAck |
| | | (Symmetry <−5) | | >30K | | Reversed |
| | | <=8 | >5 | <10k | | Interactive Balanced |
| | 220 to 400 | 8 to 40 | | <10k | | Interactive and Human |
| | >800 | 8 to 40 | ≤5 | <10k | | Request-Response |
| | | ≥40 | >5 | <10k | | Interactive |
| >500 | | ≥40 | ≤5 | <10k | | Request-Response and Transfer |
| ≥700 | | ≥30 | | ≥10k | | Transfer |

TABLE 1-continued

| Packets Per Second (PPS) | Average Packet Size (bytes) | Abs (Symmetry) | Duration (seconds) | Total Bytes | Total Packets | Determination |
|---|---|---|---|---|---|---|
| <5 | ≥700 | ≥30 | | ≥30k | | Transfer Human |
| >5 | <200 | | | ≥30k | | Interactive |
| | 200 to 600 | >5 | ≥30 | ≥30k | | Human |
| >5 | <600 | >5 | | ≥30k | | Machine |
| | 200 to 600 | >5 | | ≥30k | | Interactive |
| <0.05 | <200 | <5 | | ≥30k | | Balanced and Machine |
| >10 | >800 | <5 | | ≥30k | | Balanced and Human |
| | 200 to 800 | <5 | ≥30 | ≥30k | | Interactive |
| <5 | 200 to 800 | <5 | ≥30 | ≥30k | | Human |

Table 1 illustrates various behavior profiles, shown in the right-hand column, which may be determined according to exemplary corresponding network traffic metrics, shown in the remaining columns. For example, when network traffic metrics fall into certain ranges as defined in a particular row of Table 1, the security monitoring program 1230 could determine that the network connection corresponds to the behavior profile listed in that row of Table 1.

3.3.10. Category and Behavior Profile Determined Adaptively

In some embodiments, the categories or network connection behavior profiles may be predetermined, such as those behavior profiles described herein. In some embodiments, the security monitoring program 1230 may determine a category or behavior profile adaptively, such as based on past behavior of the connection and/or employing machine-learning regarding the past behavior of the connection. In some embodiments, the one or more behavioral profiles or predicted behavioral patterns of a connection may be determined in advance, such as the behaviors according to the herein-described behavior profiles. In some embodiments, the one or more behavioral profiles may be adaptively built based on machine-learning to identify patterns in the behavior and metrics of the connection.

3.4. Detect Potential Security Threats

In some embodiments, based on one or more of the identified network traffic metrics and/or one or more categorizations applicable to the connection, the security monitoring program 1230 may detect potential security threats. In some embodiments, the security monitoring program 1230 may determine that one or more of the identified network traffic metrics and/or one or more of the categorizations of the connection according to one or more of the herein-described behavioral profiles correspond to a behavioral pattern that represents a potential security threat to the network connection. The process of detecting potential security threats is now described in further detail.

3.4.1. Aggregate Metrics and Categorizations Associated with the Connection

In some embodiments, the security monitoring program 1230 may aggregate the identified network traffic metrics and/or the one or more categorizations associated with the connection. In some embodiments, the security monitoring program 1230 may analyze network traffic data regarding a particular network connection at various times. For example, a particular client device, such as a user's computer, smart-phone or other computing device, could connect at several different points in time with a particular host or server device, such as an email or web server. In order to monitor all interactions over such a connection, the security monitoring program 1230 may aggregate in some manner all of the metrics and/or categorizations determined at the different points in time. For example, the security monitoring program 1230 could aggregate the metrics by calculating averages or weighted averages of one or more of the metrics, by storing a list or database containing the metrics and/or categorizations the connection has exhibited, or by aggregating the metrics and/or categorizations in any technically feasible manner.

In some embodiments, such aggregation may be applicable to monitoring by the batch analyzer 1232 to monitor a log or batch of archived network traffic data associated with the connection. In some embodiments, such aggregation may also be applicable to monitoring by the real-time analyzer 1231 to monitor the network traffic data in real-time, such as by comparing metrics of the connection in real-time with aggregated metrics, or by calculating a running average of the real-time metrics and the aggregated metrics.

In some embodiments, aggregating the categorizations associated with the network connections may enable the security monitoring program 1230 to detect certain types of potential security threats, as described herein in further detail.

3.4.2. Store Metrics Associated with the Connection

In some embodiments, the security monitoring program 1230 may store the identified network traffic metrics associated with the connection in order to compare new or additional metrics with the stored metrics to detect changes or deviations in the behavior of the connection over time. In some embodiments, a potential security threat may cause the connection to deviate from predicted behavior. For example, an attack could cause a computing device to transmit data in an opposite direction or in a different way than predicted by the one or more categorizations associated with the connection, such as when the connection exchanges a very large amount of data when only a small amount of traffic is predicted, or when the connection exhibits any data transfer operations when an interactive human connection is predicted. In some embodiments, storing such metrics and/or categorizations may aid the security monitoring program 1230 in identifying such changes or deviations in the behavior of the connection.

In some embodiments, such storing of metrics associated with the connection may be applicable to monitoring by the real-time analyzer 1231 to monitor network traffic data in real-time to detect potential security threats that exhibit changes in the behavior or deviations from the predicted behavior of the connection. In some embodiments, such storing of metrics associated with the connection may also be applicable to monitoring by the batch analyzer 1232 to monitor a log or batch of archived network traffic data associated with the connection to detect potential security threats that exhibit changes in the behavior of the connection over time.

3.4.3 Detect Violations of Network Communications Protocols as Potential Security Threats In some embodiments, the security monitoring program 1230 may monitor the one or more identified metrics in order to detect when the behavior of the connection violates one or more network communication protocols. In some embodiments, network communications protocols may require a particular value or value range for a particular metric.

In some embodiments, the security monitoring program 1230 may determine when one or more of the metrics for the connection violate the permissible values or value ranges for the communication protocol being used. Accordingly, the security monitoring program 1230 may determine that such protocol violations represent a potential security threat to the network connection. For example, a communications protocol could specify that communications over a connection have, without limitation, a certain value of the symmetry metric of the connection, a certain value of the average packet size, a certain range of permissible values for a certain metric, or a certain net direction of communications. The security monitoring program 1230 may detect that a network connection violates and does not comply with the communications protocol, such as when the security monitoring program 1230 monitors a deviation in the average packet size, a deviation in the net direction of communications, or a deviation in any other metric from the allowed or permissible values or value ranges specified by the communication protocol.

In some embodiments, such determination of protocol violations associated with the connection may be applicable to monitoring by the real-time analyzer 1231 to monitor network traffic data in real-time to detect potential security threats that exhibit protocol violations or deviations from the predicted behavior of the connection. In some embodiments, such determination of protocol violations associated with the connection may also be applicable to monitoring by the batch analyzer 1232 to monitor a log or batch of archived network traffic data associated with the connection to detect potential security threats that exhibit one or more or habitual protocol violations.

3.4.4. Detect Deviations in Metrics or Behavior of Connection as Potential Security Threats In some embodiments, the security monitoring program 1230 may monitor the one or more identified metrics in order to detect when the behavior of the connection deviates from the behavior associated with previous metrics and/or one or more network connection behavior profiles used to categorize the connection.

As described herein, in some embodiments, the security monitoring program 1230 may categorize the connection by determining that the network traffic metrics indicate that the behavior of the connection resembles or corresponds to one or more behavior profiles for certain categorizations of the connection. In some embodiments, the one or more behavior profiles or predicted behavioral patterns of a connection may be determined in advance, such as the behaviors according to the herein-described categorizations. In some embodiments, the one or more behavior profiles may be adaptively built based on machine-learning to identify patterns in the behavior and metrics of the connection.

In some embodiments, the security monitoring program 1230 may acquire additional or subsequent network traffic data and identify additional or subsequent network traffic metrics for the connection. In some embodiments, the security monitoring program 1230 may determine that the additional or subsequent metrics indicate that the connection no longer exhibits the same behavioral pattern as the previous behavior of the connection. Accordingly, in some embodiments, the security monitoring program 1230 may determine that such a deviation of the behavior of the connection represents a potential security threat to the connection.

For example, the security monitoring program 1230 could determine that the additional or subsequent metrics no longer exhibit the same behavior as the previous behavior of the connection by determining that one or more of the additional or subsequent metrics deviate from one or more of the previous network traffic metrics. For example, the security monitoring program 1230 could determine that one or more of the additional or subsequent metrics for the connection vary by more than a predetermined amount from one or more values of previous network traffic metrics associated with the connection.

In some embodiments, the security monitoring program 1230 may determine that the additional or subsequent metrics no longer exhibit the same behavior as the previous behavior of the connection by determining that the connection no longer meets one or more of the same behavior profiles as determined by the initial categorization. Specifically, as described herein, the behavior profiles determined by the initial categorization may be predetermined or may be determined adaptively based on the past behavior of the connection. For example, a network connection could be used for certain types of communications, such as when a connection is used for client-server request/response interactions, such as a user surfing the web. Subsequently, in some embodiments, the behavior of the connection may change radically, such as when the connection is later used for large file transfers or probing activity. In such embodiments, the security monitoring program 1230 may determine that the connection no longer resembles or corresponds to the same behavior profile, and such a significant change in the behavior of the connection represents a potential security threat to the connection.

In some embodiments, a specific example of such a change in behavior may be when a connection is initially used for client-server request/response interactions, such as a user surfing the web, and the connection is later used for a transfer that act as an upload to a host or server device, indicating that malicious code may have been uploaded via the connection. Subsequently, the security monitoring program 1230 may detect several large file transfers that are downloads transmitted from the host or server device, indicating that data may have been stolen or transmitted from the host or sever device in a suspicious manner. In some embodiments, the security monitoring program 1230 may determine that the connection no longer resembles or corresponds to the same behavior profile and identify such a suspicious change of behavior as a potential security threat.

In some embodiments, the security monitoring program 1230 may determine that the behavior of the connection corresponds to a particular behavior profile, such as when the connection is categorized as a human connection that resembles or corresponds to a human interacting via the connection, and as a result the security monitoring program 1230 categorizes the connection as a human connection.

Subsequently, the security monitoring program 1230 may determine that the behavior of the connection no longer corresponds to the same particular behavior profile, such as when the connection subsequently resembles or corresponds to machine behavior. Thus, in some embodiments, the security monitoring program 1230 may detect this change in the behavior of the connection as a potential security threat.

In some embodiments, the security monitoring program 1230 may determine that the connection no longer meets the same behavior profiles as determined by the initial categorization by determining that the computing devices connected via the network connection now behave in accordance with a different behavior profile according to a different categorization.

In addition, in some embodiments, the security monitoring program 1230 may determine that the behavior of the connection no longer corresponds to the same particular behavior profile by determining that one or more of the network traffic metrics for the connection fall outside of a predetermined range or ranges associated with the behavior profile.

Further, in some embodiments, the security monitoring program 1230 may determine that the behavior of the connection no longer corresponds to the same particular behavior profile by determining that one or more of the network traffic metrics for the connection vary by more than a predetermined amount from values associated with the behavior profile.

In one example, some connections would not be implementing transfers, such as an average user web-surfing and not uploading any files. In this example, the connection could then implement a transfer, which could be a relatively small transfer by copying a record, such as by copying a file into a cloud-based file sharing program or by pasting a small amount of text into an email, online chat forum, or any technically feasible means for acquiring data, including files, text, or any other data. In this example, the security monitoring program 1230 could detect such a transfer, since any transfer, even such a small transfer, could be sufficient to trigger an alarm and be detected by the security monitoring program 1230 as an anomaly or potential security threat.

In some embodiments, such determination of deviations in the behavior of the connection may be applicable to monitoring by the real-time analyzer 1231 to monitor network traffic data in real-time to detect potential security threats that exhibit changes in or deviations from the predicted behavior of the connection. In some embodiments, such determination of deviations in the behavior of the connection may also be applicable to monitoring by the batch analyzer 1232 to monitor a log or batch of archived network traffic data associated with the connection to detect potential security threats that exhibit patterns in the behavior of the connection that show changes or deviations in the behavior of the connection.

3.4.5. Detect Reversed Connections as Potential Security Threats

In some embodiments, as described herein, the security monitoring program 1230 may categorize a connection as reversed when the amount of data transmitted by a client device to a host or server device exceeds the amount of data transmitted by the host or server computing device to the client device. Specifically, according to many network communication protocols or operating procedures, a host or server device may generally be required to transmit more data than the client device. In some embodiments, the security monitoring program 1230 may determine that the connection is reversed when the client device is transmitting the majority of the data. Accordingly, in some embodiments, the security monitoring program 1230 may determine that such reversed connections represent a potential security threat to at least one of the computing devices connected via the connection. In another example, an attack could be in the form of a computer program or piece of shellcode such as a reverse shell code, where an attacker controls a target computing device to control the operations and communications of the target computing device. In another example, an attacker could use a reverse command shell, where a client connects to a remote server in a way that allows the remote server to issue commands to the client. In another example, for a connection that is categorized as a Request/Response connection, such as a user surfing the web and the majority of data is transmitted to the user's client computer, categorizing such a connection as a reversed connection may represent an attack, such as when an attacker causes the connection to be reversed to steal data from the user's client computer, such as by using an exploit such as a buffer overflow.

In some embodiments, such determination of a reversed connection may be applicable to monitoring by the real-time analyzer 1231 to monitor network traffic data in real-time to detect potential security threats that exhibit communications in the reverse of the predicted behavior of the connection. In some embodiments, such determination of a reversed connection may also be applicable to monitoring by the batch analyzer 1232 to monitor a log or batch of archived network traffic data associated with the connection to detect potential security threats that exhibit patterns in the behavior of the connection that show reversals of the connection.

3.4.6. Detect Certain Transfer Connections as Potential Security Threats

As described herein, in some embodiments, the security monitoring program 1230 may categorize a connection as a transfer when the identified metrics for the connection indicate that the connected computing devices behave in the manner of performing a file transfer, such as when the metrics exhibit a significant amount of asymmetry and a significant amount of efficiency, with little to no interactivity. In addition, as described herein, when a connection is classified as a transfer, a data transfer bytes metric may indicate the number of bytes transmitted by a dominant side of the connection, such as the side of the connection that transmits the majority of the data exchanged via the connection. In some embodiments, the data transfer metric may indicate the total number of bytes exchanged via the transfer connection. In some embodiments, denoting a separate metric for data transfer bytes only for connections that correspond to transfers may increase the accuracy and efficiency of evaluating connections for certain types of security threats.

In some embodiments, a security monitoring program 1230 may accurately detect a security threat such as a threat resembling data exfiltration in accordance with monitoring such transfer connections. Specifically, data exfiltration corresponds to the unauthorized access or theft of data stored on a computing device. Accordingly, in some embodiments, the security monitoring program 1230 may detect when an attacker: (1) sends abnormal amounts of data outside of network; or (2) collects abnormal amounts of data from within the internal network.

In some embodiments, the security monitoring program 1230 may monitor only connections that are categorized as transfers in order to increase efficiency and accuracy of the security monitoring program 1230 by not monitoring all connections in total. In conventional systems, conventional security monitors may monitor all traffic and all volume associated with all connections, and attacks which perform an attack such as data exfiltration may be camouflaged or hidden among all of the network traffic and may go undetected by conventional systems. By contrast, in some embodiments, the security monitoring program 1230 may categorize the network connection as a transfer and analyze all connections that correspond to transfers and only those connections that correspond to transfers. In such cases, by analyzing all connections that correspond to transfers, even small transfers, are detected and are not camouflaged among all of the network traffic. Further, in such cases, by analyzing only the connections that are transfers, the security monitoring program 1230 may analyze the data bytes metric and other identified metrics of these transfer connections to determine the amount and direction of data being transferred.

For example, an attack such as data exfiltration could be detected based on transfers having a certain direction that indicates an unauthorized access or theft of data stored on a computing device. In some embodiments, the security monitoring program 1230 may detect a potential security threat resembling data exfiltration with a high confidence when the connection indicates that data is being transferred efficiently in one direction, such as when an attacker is stealing files. For example, such a potential security threat resembling data exfiltration could be detected when the connection is a transfer connection and has a large efficiency metric or average packet size, indicating that data is being transferred efficiently, and a large asymmetry, thus indicating that data transmissions are largely in one direction. For example, for connections exchanging under a certain amount of data (e.g., less than 10 kbytes), the security monitoring program 1230 may detect a potential security threat resembling data exfiltration when the connection has an efficiency metric or average packet size over a certain threshold (e.g., over 500 bytes per packet), a very large asymmetry, such as a magnitude of a symmetry metric over a certain threshold (e.g., Abs(symmetry) of greater than or equal to 40), and a short duration (e.g., under 5 seconds). In another example, for connections exchanging over a certain amount of data (e.g., at least 10 kbytes), the security monitoring program 1230 may detect a potential security threat resembling data exfiltration when the connection has an efficiency metric or average packet size over a certain threshold (e.g., over 700 bytes per packet) and a large asymmetry, such as a magnitude of a symmetry metric over a certain threshold (e.g., Abs(symmetry) of greater than or equal to 30).

In one example, as described herein, some connections would not be implementing transfers, such as connections associated with an average human user web-surfing and not uploading any files. In this example, the connection could then implement a transfer, which could be a relatively small transfer by copying a record, such as by copying a file into a cloud-based file sharing program or by pasting a small amount of text into an email, online chat forum, or any technically feasible means for acquiring data, including files, text, or any other data. In this example, the security monitoring program 1230 may detect such a transfer, since any transfer, even such a small transfer, could be sufficient to trigger an alarm and be detected by the security monitoring program 1230 as an anomaly representing data exfiltration.

In other embodiments, the security monitoring program 1230 may detect excess data collection by analyzing only connections classified as transfers, and detecting deviations in the amount of data being transferred. In a further example, the security monitoring program 1230 may detect a secure copy to an external source by analyzing only connections classified as transfers, and detecting properties of the connection that correspond to a secure copy to an external source.

In some embodiments, such determination that certain transfers in the behavior of the connection resemble or correspond to a potential security threat may be applicable to monitoring by the real-time analyzer 1231 to monitor network traffic data in real-time to detect potential security threats that exhibit certain transfer behaviors in the connection. In some embodiments, such determination that certain transfers in the behavior of the connection resemble or correspond to a potential security threat may also be applicable to monitoring by the batch analyzer 1232 to monitor a log or batch of archived network traffic data associated with the connection to detect potential security threats that exhibit certain transfer behaviors in the connection.

3.4.7. Detect Probe or Probe/Ack Activity as Potential Security Threats

As described herein, in some embodiments, the security monitoring program 1230 may categorize a connection as a probe or probe/ACK when the identified metrics for the connection indicate that the computing devices associated with the connection behave in a manner consistent with a probe or probe/ACK, such as by exchanging a small number of packets to probe one or more ports of a computing device, such as when an attacker is seeking a way to connect to a computing device. In some embodiments, a connection may represent an exchange of a small number of packets via a single port of a computing device. In some embodiments, one or more connections may represent an exchange of a small number of packets via more than one port of a computing device. As described herein, in some embodiments, connections may be represented as probe or probe/ACK connections via flags having a value of 0 or 1. In such embodiments, the flags indicating probe or probe/ACK connections may be stored and counted, in order to determine the amount of probe or probe/ACK activity over time. For example, flags indicating a probe or probe/ACK connection may be assigned for a connection to a single port of a computing device. Such flags may be stored for this single port over time, in order to analyze the behavior via connections to this single port of the computing device.

In some embodiments, probe and probe/ACK connections may represent unusual activity for a connection, in contrast to a connection of an average user web-surfing and not seeking to probe or ping any computing devices or specific ports on computing devices. Conventional security monitors may monitor all traffic and all volume associated with all connections, and attacks which perform such probing performed by probe and probe/ACK connections may be camouflaged or hidden among all of the network traffic. For example, in conventional systems, an attacker could avoid detection by issuing a single probe at a time, or by issuing a number of probes spaced out over a long period of time, to let the one or more probe connections blend in with all of the other network traffic. Specifically, a conventional system which does not categorize a connection does not perform any specific monitoring for probe or probe/ACK connections.

By contrast, in some embodiments, the security monitoring program 1230 may seek and analyze connections that correspond to probing activities associated with probe and probe/ACK connections. For example, the security monitoring program 1230 may seek probe connections by determining when the connections exchange a small number of packets, such as a number of packets under a certain threshold (e.g., total packets exchanged is from 1 to 3). In addition, the security monitoring program 1230 may seek probe/ACK connections by determining when the connections exchange a small number of packets, such as within a predetermined range (e.g., total packets exchanged is from 2 to 3). In such embodiments, by specifically analyzing the connections that are probes or probe/ACK connections, the security monitoring program 1230 may detect such unusual activity as potential security threats.

In some embodiments, the security monitoring program 1230 may store such indications of probe or probe/ACK connections. In such embodiments, the security monitoring program 1230 is able to preserve the knowledge of scanned or probed ports for a length of time in the stored and/or aggregated data. Thus, the security monitoring program 1230 is able to discern probe or probe/ACK behavior that occurs over time.

For example, the security monitoring program 1230 could detect lateral scans by detecting a client device probing for a specific service or services across multiple devices. Further, the security monitoring program 1230 could detect vertical or distributed scans by detecting one or more client devices probing multiple ports on the same target device. In addition, the security monitoring program 1230 could detect a computing device that is sending a repeating series of probes to a set of communication ports on one or more computing devices, which may be referred to as port knocking. The security monitoring program 1230 could detect such behavior by detecting a client device probing multiple ports along with a non-probe or probe/ACK connection between the same client and server. Moreover, the security monitoring program 1230 could detect malicious code, such as malware, or lateral movement by an attacker by analyzing and detecting connections which exhibit probe and probe/ACK behavior.

In some embodiments, monitoring of probe and probe/ACK connections may be applicable to monitoring by the batch analyzer 1232 to monitor a log or batch of archived network traffic data associated with the connection to detect potential security threats that exhibit patterns of probing behavior. In some embodiments, such monitoring of probe and probe/ACK connections may also be applicable to monitoring by the real-time analyzer 1231 to monitor network traffic data in real-time to detect potential security threats that exhibit patterns of probing behavior.

3.5. Initiate Mitigation Action

In some embodiments, in response to detecting a potential security threat, the security monitoring program 1230 may initiate a mitigation action to address the potential security threat. For example, the security monitoring program 1230 may display a representation of the potential security threat to a user on a user interface. In some embodiments, the user interface may be represented in the form of a dashboard representing the status of several connections. In some embodiments, the security monitoring program 1230 may perform one or more corrective actions to correct the potential security threat.

Figure 13:
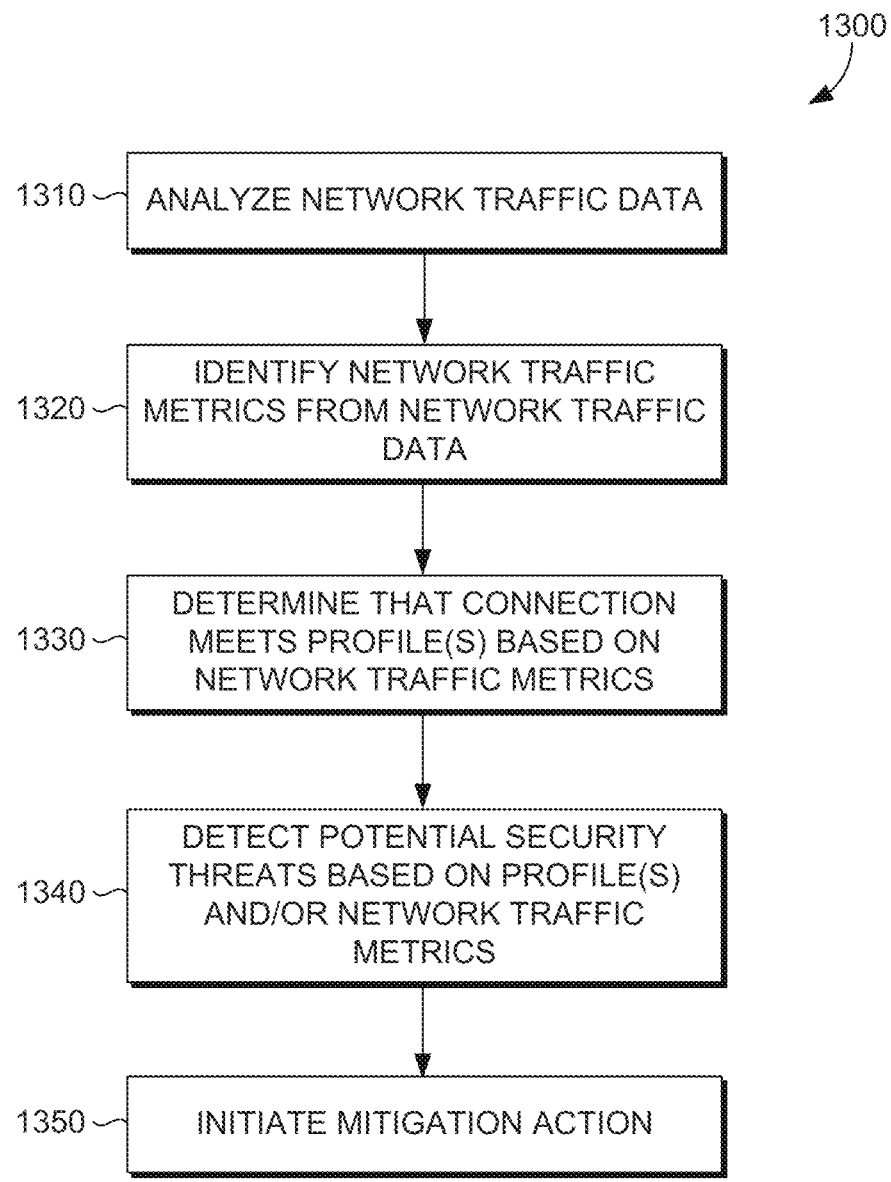
FIG. 13 illustrates a flow diagram of method steps for monitoring a network connection for security risks in accordance with the disclosed embodiments.

FIG. 13 is a flow diagram of method steps for performing security monitoring of a network connection, in accordance with the disclosed embodiments. Although the method steps are described in conjunction with the systems of FIGS. 1-2 and 9-12, those of skill in the art will understand that any system configured to perform the method steps, in any order, is within the scope of the present invention.

As shown, a method 1300 begins at step 1310, where a security monitoring system 1116 receives network traffic data representing network traffic exchanged over a network connection via one or more networks 104. In various embodiments, step 1310 may be performed by the security monitoring program 1230 or one or more parts of the security monitoring program 1230, including the real-time analyzer 1231 and the batch analyzer 1232.

The network traffic data may have any technically feasible form, including, without limitation, metadata, raw machine data, event data derived from the raw machine data as further described herein, metadata regarding data packets exchanged via the connection, data packets, portions of data packets, such as packet headers, any forms of metadata regarding the network traffic, or any other form of data from a data source. In some embodiments, the security monitoring system 1116 may access the network traffic data from log files associated with client devices 102, log files associated with host devices 106, packet capture data derived from message traffic over networks 104, or any other technically feasible real-time or archived data source for data representing network traffic exchanged via network connections.

At step 1320, the security monitoring system 1116 identifies network traffic metrics representing various aspects of the connection and/or the data packets exchanged via the connection. In some embodiments, the security monitoring system 1116 may perform an extract, transform, and load (ETL) process to identify the following metrics from the network traffic data. In various embodiments, step 1320 may be performed by the security monitoring program 1230 or one or more parts of the security monitoring program 1230, including the real-time analyzer 1231 and the batch analyzer 1232.

As described herein, in some embodiments, the security monitoring system 1116 may identify network traffic metrics indicating the network traffic patterns and behavior of the network connection, including, without limitation, metrics such as a total number of bytes exchanged via the connection, a total number of bytes transmitted by a computing device at each side of the connection, a duration of the connection, an average packet size for packets exchanged via the connection, the number of packets exchanged per second (PPS) via the connection, and the symmetry indicating the degree to which the connection is lopsided, where more data is transmitted in one direction than in the opposite direction.

At step 1330, the security monitoring system 1116 categorizes or classifies the network connection, in accordance with the identified network traffic metrics. In some embodiments, the security monitoring system 1116 may determine that the behavior of the network traffic metrics corresponds closely to or resembles or corresponds to one or more network connection behavior profiles. In various embodiments, step 1330 may be performed by the security monitoring program 1230 or one or more parts of the security monitoring program 1230, including the real-time analyzer 1231 and the batch analyzer 1232.

As described herein, in some embodiments, the security monitoring system 1116 may categorize the connection as one or more of a transfer connection, a request/response connection, a human connection, a machine connection, a probe or probe/ACK connection, an interactive connection, a balanced connection, a reversed connection, and/or a category that is determined adaptively based on machine-learning regarding the past behavior of the connection.

At step 1340, the security monitoring system 1116 determines that one or more of the network traffic metrics and/or one or more of the categorizations of the connection represents a potential security threat to the connection. Specifically, the security monitoring system 1116 determines that one or more of the network traffic metrics and/or one or more of the identified categorizations according to one or more of the herein profiles correspond to a behavioral pattern that represents a potential security threat to the network connection. In various embodiments, step 1340 may be performed by the security monitoring program 1230 or one or more parts of the security monitoring program 1230, including the real-time analyzer 1231 and the batch analyzer 1232.

As described herein, in some embodiments, the security monitoring system 1116 may monitor the identified metrics and the categorizations and identifies a potential security threat, including, without limitation, detecting violations of network communications protocols, detecting deviations or changes in the network traffic metrics associated with the connection, detecting reversed connections, detecting certain types of suspicious transfer connections, and detecting suspicious probe or probe/ACK activity.

At step 1350, the security monitoring system 1116 initiates a mitigation action, in response to detecting a potential security threat, in order to address the potential security threat. In various embodiments, step 1350 may be performed by the security monitoring program 1230 or one or more parts of the security monitoring program 1230, including the real-time analyzer 1231 and the batch analyzer 1232.

For example, the security monitoring system 1116 could display a representation of the potential security threat to a user on a user interface, or as a dashboard representing the status of several connections. In some embodiments, the security monitoring system 1116 may perform one or more corrective actions to correct the potential security threat. The method 900 then terminates.

Figure 14:
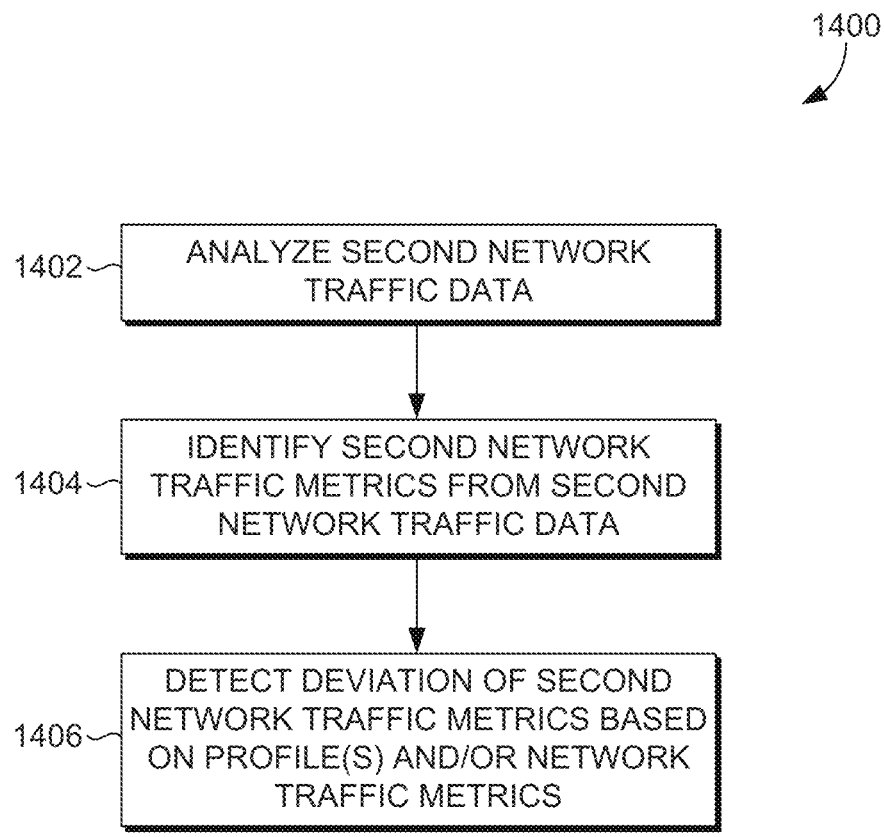
FIG. 14 illustrates a flow diagram of method steps for detecting a network security threat in accordance with the disclosed embodiments.

FIG. 14 is a flow diagram of method steps for detecting a network security threat in accordance with the disclosed embodiments. Although the method steps are described in conjunction with the systems of FIGS. 1-2 and 9-12, those of skill in the art will understand that any system configured to perform the method steps, in any order, is within the scope of the present invention. Note that the method of FIG. 14 provides a more detailed account of steps performed within step 1340 of FIG. 13 in accordance with some embodiments of the present invention.

As shown, a method 1400 begins at step 1402, where the security monitoring system 1116 receives and analyzes second network traffic data representing subsequent or additional network traffic exchanged over the connection. In various embodiments, step 1402 may be performed by the security monitoring program 1230 or one or more parts of the security monitoring program 1230, including the real-time analyzer 1231 and the batch analyzer 1232.

The second network traffic data may have any technically feasible form, including, without limitation, metadata, raw machine data, event data derived from the raw machine data as further described herein, metadata regarding data packets exchanged via the connection, data packets, portions of data packets, such as packet headers, any forms of metadata regarding the network traffic, or any other form of data from a data source. In some embodiments, the security monitoring system 1116 may access the network traffic data from log files associated with client devices 102, log files associated with host devices 106, packet capture data derived from message traffic over networks 104, or any other technically feasible real-time or archived data source for data representing network traffic exchanged via network connections.

At step 1404, the security monitoring system 1116 identifies second network traffic metrics from the accessed second network traffic data to indicate parameters and/or metrics for the data, such as data packets, exchanged via the network connection. In various embodiments, step 1404 may be performed by the security monitoring program 1230 or one or more parts of the security monitoring program 1230, including the real-time analyzer 1231 and the batch analyzer 1232.

At step 1406, the security monitoring system 1116 detects that the second network traffic data may represent potential security threats to the connection. In various embodiments, step 1406 may be performed by the security monitoring program 1230 or one or more parts of the security monitoring program 1230, including the real-time analyzer 1231 and the batch analyzer 1232. In some embodiments, the security monitoring system 1116 detects deviations of the second network traffic metrics from previous network traffic metrics and/or deviations of the second network traffic metrics from behavior predicted by the previous categorization of the connection. The method 1400 then terminates.

Figure 15:
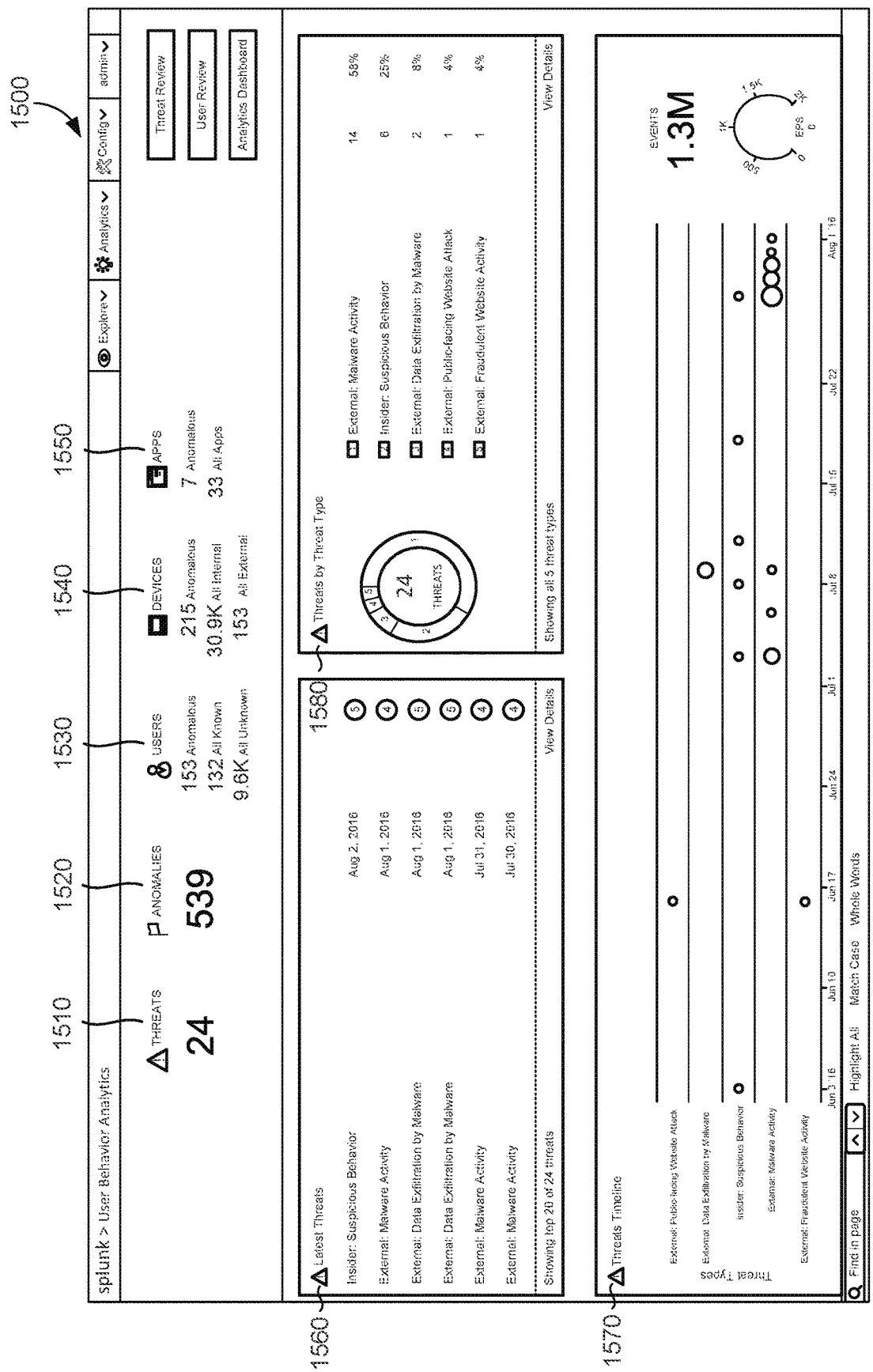
FIG. 15 illustrates an example of a user interface for displaying potential security threats in accordance with the disclosed embodiments.

FIG. 15 illustrates an example user interface for displaying potential security threats in accordance with the disclosed embodiments. As shown, FIG. 15 displays a dashboard-type of user interface 1500 for displaying potential security threats to a user or network operator. Those skilled in the art will understand that a mitigation action may be implemented via any technically feasible means, including any technically feasible user interface or alert system. In some embodiments, the security monitoring system 1116 may perform one or more corrective actions to correct the potential security threat, such as by executing anti-virus software, anti-malware operations, or any technically feasible software or hardware corrective actions to mitigate potential security threats.

As shown, the security monitoring system 1116 displays a dashboard-type of user interface 1500 for displaying potential security threats, including threats 1510 and anomalies 1520 characterized by anomalous network traffic metrics. In addition, as shown, the dashboard-type of user interface 1500 may display an indication of the potential security threats as being associated with particular users 1530, associated with particular computing devices 1540, or associated with particular applications 1550. Further, as shown, the dashboard-type of user interface 1500 may indicate the latest potential security threats to arise 1560 and may display a timeline 157 indicating when each potential security threat arose. Moreover, as shown, the dashboard-type of user interface 1500 may display an indication of how the potential security threats are divided by the type of security threat.

FIG. 16 illustrates an example user interface for displaying a reverse shell potential security threat in accordance with the disclosed embodiments. As shown, FIG. 16 displays a dashboard-type of user interface 1600 for displaying reverse shell potential security threats to a user or network operator. Particularly, as shown, the dashboard-type of user interface 1600 displays an indication of any reverse shell potential security threats 1610.

Figure 17A:
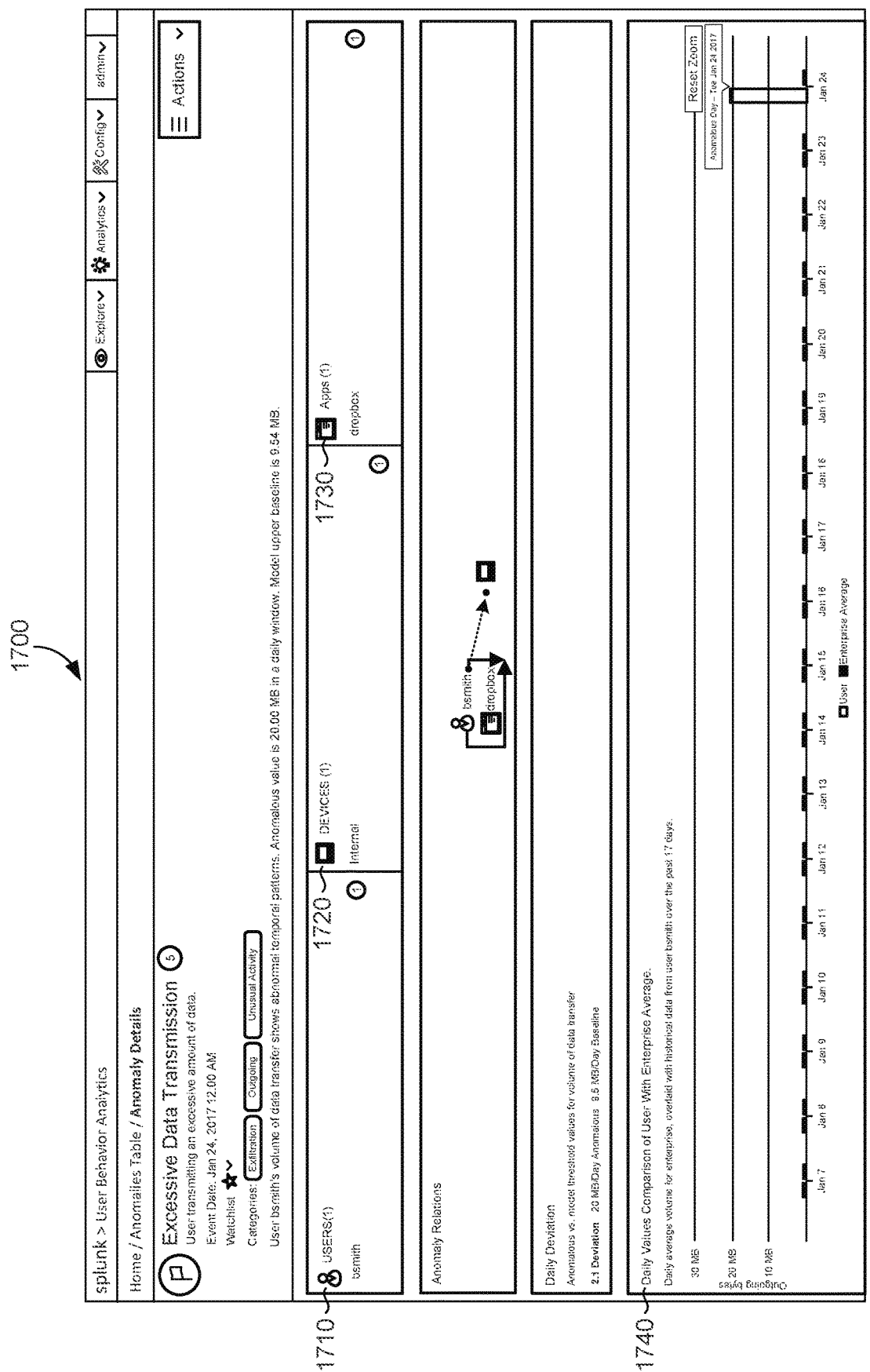
FIG. 17A illustrates an example of a user interface for displaying an excessive data transmission potential security threat in accordance with the disclosed embodiments.
Figure 17B:
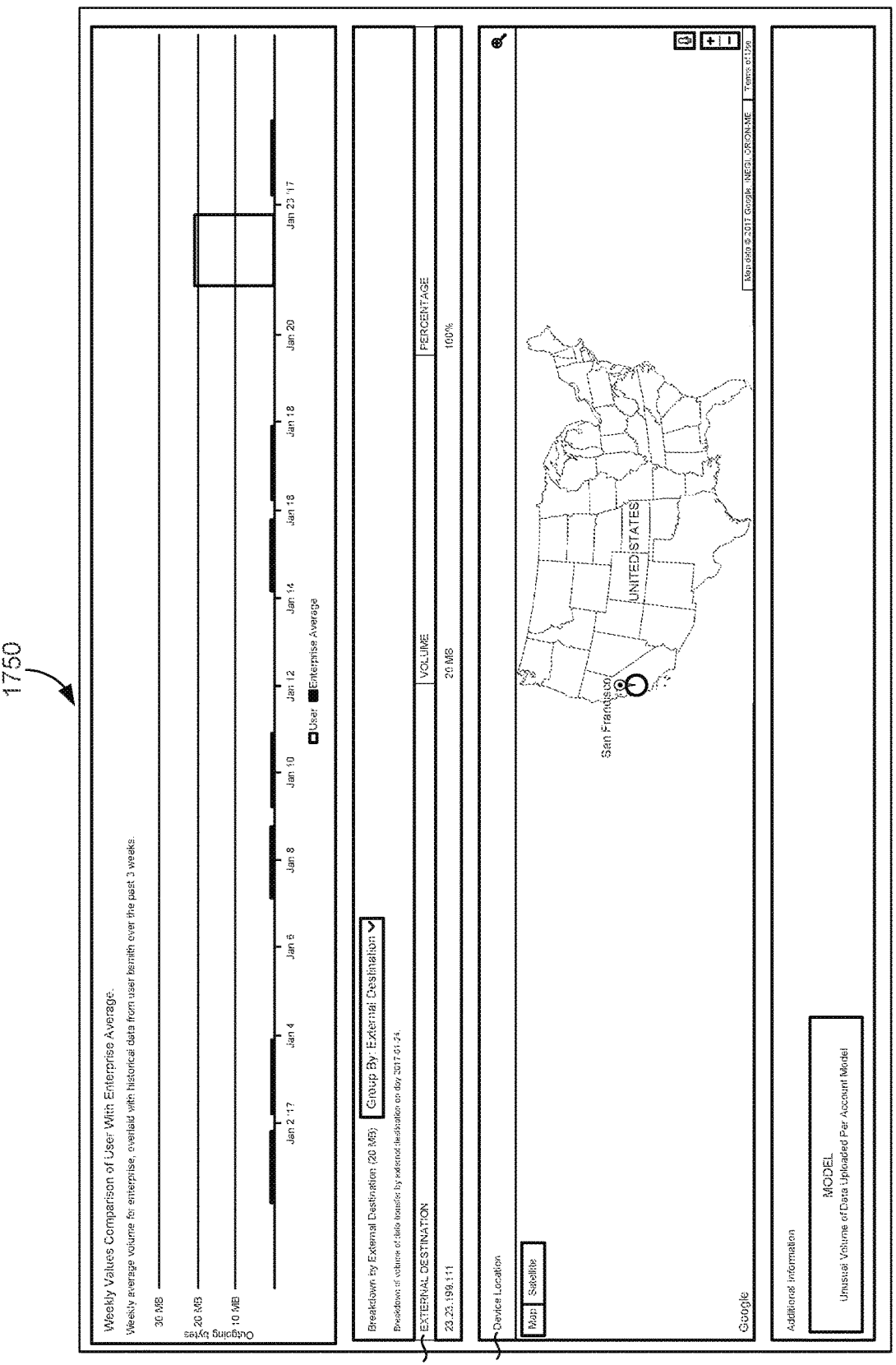
FIG. 17B illustrates an additional example of a user interface for displaying an excessive data transmission potential security threat in accordance with the disclosed embodiments.

FIGS. 17A and 17B illustrate an example user interface for displaying an excessive data transmission potential security threat in accordance with the disclosed embodiments. As shown, FIGS. 17A and 17B display a dashboard-type of user interface 1700 for displaying excessive data transmission potential security threats to a user or network operator. Particularly, as shown, the dashboard-type of user interface 1700 may display an indication of the potential security threats as being associated with particular users 1710, associated with particular computing devices 1720, or associated with particular applications 1730. Further, as shown, the dashboard-type of user interface 1700 may indicate a daily comparison 1740 of an amount of data transmissions by a particular user with an enterprise average over an entire enterprise or computer network.

In addition, as shown in FIG. 17B, the dashboard-type of user interface 1700 may indicate a weekly comparison 1750 of an amount of data transmissions by the particular user with an enterprise average over an entire enterprise or computer network. Moreover, as shown in FIG. 17B, the dashboard-type of user interface 1700 may indicate a destination address 1760 of the excessive data transmission amounting to a potential security threat, as well as a map showing a location in the world of the destination 1770 of the excessive data transmission amounting to a potential security threat.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. In one example, and without limitation, the techniques described herein are implemented in conjunction with the system architecture described in conjunction in FIGS. 1-17B. However, the described techniques could be implemented in conjunction with any technically feasible system architecture that generates the requisite data upon which the disclosed techniques are based. In particular, the security monitoring system 1116 could be implemented to receive and analyze raw machine data and/or any other form of data in any technically feasible format. Further, the security monitoring system 1116 could analyze data received from the data intake and query system 108 described in conjunction with FIGS. 1-10, from any alternative computer system capable of generating such data, or any technically feasible combination thereof.

In sum, an approach for more effectively monitoring a network connection between a first computing device and a second computing device is disclosed. Specifically, a security monitor analyzes network traffic data associated with the network connection. The security monitor identifies one or more network traffic metrics from the network traffic data associated with the network connection, that may include one of more of an average packet size exchanged via the network connection, a total number of packets per second exchanged via the network connection in either direction, a symmetry value defining the relative amounts of data being communicated in one direction versus the opposite direction, and a total duration of the network connection. The security monitor then determines that the network connection corresponds to one or more network profiles based on the one or more network traffic metrics. The security monitor then detects a potential security threat for the network connection based on at least one of the one or more network traffic metrics and the one or more network connection profiles. Further, in response to detecting the potential security threat, the security monitor initiates a mitigation action with respect to the network connection.

At least one advantage of the disclosed techniques is that, by monitoring the metrics identified from the network traffic data associated with the network connection, the security monitor detects potential security threats, such as exfiltration, with increased accuracy relative to prior approaches. The detecting of potential security threats without monitoring the specific content of the data or the total volume of all exchanges avoids the disadvantages associated with conventional approaches, as described herein. Further, monitoring based on the metrics of the network traffic data increases efficiency of the security monitoring, as the metrics and the network traffic data may be derived directly from the network traffic.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
analyzing network traffic data for a first network connection associated with a computing device;
identifying, based on the network traffic data, a first set of network metrics for the first network connection;
classifying, based on the first set of network metrics, the first network connection as corresponding to a first network connection profile included in a plurality of network connection profiles, wherein the first network connection profile specifies a first plurality of network metrics, wherein the first plurality of network metrics include a responsiveness metric that indicates a number of packets exchanged per second via a network connection corresponding to the first network connection profile, and wherein the first set of network metrics corresponds to the first plurality of network metrics;
detecting a potential security threat for the first network connection based on the first network connection profile; and
initiating a mitigation action with respect to the first network connection in response to detecting the potential security threat.

2. The computer-implemented method of claim 1, wherein the first network connection profile specifies at least two different types of metrics, wherein the at least two different types of metrics include a symmetry metric, the responsiveness metric, and an efficiency metric.

3. The computer-implemented method of claim 1, wherein the first network connection profile specifies a symmetry metric, wherein the symmetry metric is based on a number of bytes transmitted in one direction via the network connection and a number of bytes transmitted in an opposite direction via the network connection during a particular time duration.

4. The computer-implemented method of claim 1, wherein the responsiveness metric represents a responsiveness of one or more computing devices exchanging data via the network connection.

5. The computer-implemented method of claim 1, wherein the first network connection profile specifies an efficiency metric, wherein the efficiency metric represents an efficiency of the network connection.

6. The computer-implemented method of claim 1, wherein the first network connection profile specifies an efficiency metric, wherein the efficiency metric indicates an average size of a plurality of packets exchanged via the network connection.

7. The computer-implemented method of claim 1, wherein: a second network connection profile included in the plurality of network connection profiles specifies a second plurality of network metrics that is different from the first plurality of network metrics specified by the first network connection profile.

8. The computer-implemented method of claim 7, wherein:
the first plurality of network metrics specifies at least a first network metric and a second network metric; and
the second plurality of network metrics specifies at least a third network metric and a fourth network metric, wherein the first network metric, second network metric, third network metric, and fourth network metric comprise different network metrics.

9. The computer-implemented method of claim 7, wherein:
the first plurality of network metrics specifies a first network metric, at least one of a first threshold or a first range for the first network metric, a second network metric, and at least one of a second threshold or a second range for the second network metric; and
the second plurality of network metrics specifies a third network metric, at least one of a third threshold or a third range for the third network metric, a fourth network metric, and at least one of a fourth threshold or a fourth range for the fourth network metric, wherein the first network metric is different from the third network metric and the fourth network metric.

10. The computer-implemented method of claim 1, wherein the plurality of network connection profiles are predetermined prior to analyzing the network traffic data.

11. The computer-implemented method of claim 1, wherein detecting the potential security threat comprises determining, after the first set of network metrics is identified based on the network traffic data, that each network metric included in the first set of network metrics has subsequently deviated from each corresponding network metric included in the first plurality of network metrics specified by the first network connection profile.

12. The computer-implemented method of claim 1, wherein detecting the potential security threat comprises determining, after the first set of network metrics is identified based on the network traffic data, that at least one network metric included in the first set of network metrics has subsequently deviated from at least one corresponding network metric specified in the first plurality of network metrics by a predetermined threshold amount.

13. One or more non-transitory computer-readable storage media including instructions that, when executed by one or more processors, cause the one or more processors to perform the steps of:
analyzing network traffic data for a first network connection associated with a computing device;
identifying, based on the network traffic data, a first set of network metrics for the first network connection;
classifying, based on the first set of network metrics, the first network connection as corresponding to a first network connection profile included in a plurality of network connection profiles, wherein the first network connection profile specifies a first plurality of network metrics, wherein the first plurality of network metrics include a responsiveness metric that indicates a number of packets exchanged per second via a network connection corresponding to the first network connection profile, and wherein the first set of network metrics corresponds to the first plurality of network metrics;

detecting a potential security threat for the first network connection based on the first network connection profile; and initiating a mitigation action with respect to the first network connection in response to detecting the potential security threat.

14. The one or more non-transitory computer-readable storage media of claim 13, wherein the first network connection profile specifies at least two different types of metrics, wherein the at least two different types of metrics include a symmetry metric, the responsiveness metric, and an efficiency metric.

15. The one or more non-transitory computer-readable storage media of claim 13, wherein the first network connection profile specifies a symmetry metric, wherein the symmetry metric is based on a number of bytes transmitted in one direction via the network connection and a number of bytes transmitted in an opposite direction via the network connection during a particular time duration.

16. The one or more non-transitory computer-readable storage media of claim 13, wherein the responsiveness metric represents a responsiveness of one or more computing devices exchanging data via the network connection.

17. The one or more non-transitory computer-readable storage media of claim 13, wherein the first network connection profile specifies an efficiency metric, wherein the efficiency metric represents an efficiency of the network connection.

18. The one or more non-transitory computer-readable storage media of claim 13, wherein:
a second network connection profile included in the plurality of network connection profiles specifies a second plurality of network metrics that is different from the first plurality of network metrics specified by the first network connection profile.

19. The one or more non-transitory computer-readable storage media of claim 18, wherein:
the first plurality of network metrics specifies at least a first network metric and a second network metric; and
the second plurality of network metrics specifies at least a third network metric and a fourth network metric, wherein the first network metric, second network metric, third network metric, and fourth network metric comprise different network metrics.

20. The one or more non-transitory computer-readable storage media of claim 13, wherein the plurality of network connection profiles are predetermined prior to analyzing the network traffic data.

21. The one or more non-transitory computer-readable storage media of claim 13, wherein detecting the potential security threat comprises determining, after the first set of network metrics is identified based on the network traffic data, that at least one network metric included in the first set of network metrics has subsequently deviated from at least one corresponding network metric specified in the first plurality of network metrics by a predetermined threshold amount.

22. A computing device, comprising:
a memory that includes a security monitoring program; and
a processor that is coupled to the memory and, when executing the security monitoring program, is configured to perform the steps of:
analyzing network traffic data for a first network connection associated with a computing device;
identifying, based on the network traffic data, a first set of network metrics for the first network connection;
classifying, based on the first set of network metrics, the first network connection as corresponding to a first network connection profile included in a plurality of network connection profiles, wherein the first network connection profile specifies a first plurality of network metrics, wherein the first plurality of network metrics include a responsiveness metric that indicates a number of packets exchanged per second via a network connection corresponding to the first network connection profile, and wherein the first set of network metrics corresponds to the first plurality of network metrics;
detecting a potential security threat for the first network connection based on the first network connection profile; and
initiating a mitigation action with respect to the first network connection in response to detecting the potential security threat.

23. The computing device of claim 22, wherein the first network connection profile specifies at least two different types of metrics, wherein the at least two different types of metrics include a symmetry metric, the responsiveness metric, and an efficiency metric.

24. The computing device of claim 22, wherein the first network connection profile specifies a symmetry metric, wherein the symmetry metric is based on a number of bytes transmitted in one direction via the network connection and a number of bytes transmitted in an opposite direction via the network connection during a particular time duration.

25. The computing device of claim 22, wherein the responsiveness metric represents a responsiveness of one or more computing devices exchanging data via the network connection.

26. The computing device of claim 22, wherein the first network connection profile specifies an efficiency metric, wherein the efficiency metric represents an efficiency of the network connection.

27. The computing device of claim 22, wherein:
a second network connection profile included in the plurality of network connection profiles specifies a second plurality of network metrics that is different from the first plurality of network metrics specified by the first network connection profile.

28. The computing device of claim 27, wherein:
the first plurality of network metrics specifies at least a first network metric and a second network metric; and
the second plurality of network metrics specifies at least a third network metric and a fourth network metric, wherein the first network metric, second network metric, third network metric, and fourth network metric comprise different network metrics.

29. The computing device of claim 22, wherein the plurality of network connection profiles are predetermined prior to analyzing the network traffic data.

* * * * *